(12) United States Patent
Cartwright et al.

(10) Patent No.: US 11,301,788 B2
(45) Date of Patent: Apr. 12, 2022

(54) DATA USAGE AND AGGREGATION IN A FOOD PRODUCT ASSET RELATED NETWORK

(71) Applicant: Illinois Tool Works Inc., Glenview, IL (US)

(72) Inventors: Richard W. Cartwright, Piqua, OH (US); Damon C. Childers, Scottsdale, AZ (US); Eric A. Soller, Dayton, OH (US)

(73) Assignee: Illinois Tool Works, Inc., Glenview, IL (US)

(*) Notice: Subject to any disclaimer, the term of this patent is extended or adjusted under 35 U.S.C. 154(b) by 774 days.

(21) Appl. No.: 14/362,928

(22) PCT Filed: Dec. 14, 2012

(86) PCT No.: PCT/US2012/069828
§ 371 (c)(1),
(2) Date: Jun. 5, 2014

(87) PCT Pub. No.: WO2013/090768
PCT Pub. Date: Jun. 20, 2013

(65) Prior Publication Data
US 2014/0310189 A1 Oct. 16, 2014

Related U.S. Application Data

(60) Provisional application No. 61/576,560, filed on Dec. 16, 2011.

(51) Int. Cl.
*G06Q 10/06* (2012.01)
*H04L 65/1073* (2022.01)
(Continued)

(52) U.S. Cl.
CPC ....... *G06Q 10/0631* (2013.01); *G06Q 10/101* (2013.01); *G06Q 50/01* (2013.01);
(Continued)

(58) Field of Classification Search
CPC ........... G06Q 10/0631; G06Q 30/0633; G06Q 10/101; G06Q 50/01; H04L 65/1073; H04L 65/403; H04L 67/10; Y02P 90/80
(Continued)

(56) References Cited

U.S. PATENT DOCUMENTS 678,906 A 7/1901 Rogers
5,875,430 A 2/1999 Koether
(Continued)

FOREIGN PATENT DOCUMENTS

CN 1285485 A 2/2001
CN 1496467 A 5/2004
(Continued)

OTHER PUBLICATIONS

Jin Sook Ahn, So Young Sohn, Customer Pattern Search for After-Sales Service in Manufacturing, Apr. 2009, Expert Systems with Applications, vol. 36, Issue 3, Part 1, pp. 5371-5375. (Year: 2009).*
(Continued)

*Primary Examiner* — Jason B Dunham
*Assistant Examiner* — Brittany E Bargeon
(74) *Attorney, Agent, or Firm* — Burr & Forman, LLP

(57) ABSTRACT

A method for enabling network communication relating to a food preparation asset may include receiving, from a third party participant, a registration request to join a community including asset operators that operate at least one food preparation asset, registering the third party participant as a community member, providing the third party participant with access to a communication network for sharing infor-
(Continued)

mation related to the asset, receiving data indicative of asset related activity, providing the third party participant with data indicative of asset related activity, and enabling the third party participant to establish communications with the asset or asset operators via the communication network based on the data indicative of asset related activity.

19 Claims, 13 Drawing Sheets

(51) Int. Cl.
   *G06Q 50/00* (2012.01)
   *H04L 65/403* (2022.01)
   *G06Q 10/10* (2012.01)
   *H04L 67/10* (2022.01)
(52) U.S. Cl.
   CPC ........ *H04L 65/1073* (2013.01); *H04L 65/403* (2013.01); *H04L 67/10* (2013.01); *Y02P 90/80* (2015.11)
(58) Field of Classification Search
   USPC ........................................................ 705/26.8
   See application file for complete search history.

(56) References Cited

U.S. PATENT DOCUMENTS

| | | | |
|---|---|---|---|
| 6,204,763 | B1 | 3/2001 | Sone |
| 6,789,067 | B1 | 9/2004 | Liebenow |
| 7,092,988 | B1 | 8/2006 | Bogatin et al. |
| 7,210,625 | B2 | 5/2007 | McNutt et al. |
| 8,712,851 | B2 | 4/2014 | Koether et al. |
| 8,892,482 | B2 | 11/2014 | Cheng et al. |
| 10,748,156 | B2 | 8/2020 | Hunter |
| 2002/0030051 | A1 | 3/2002 | Thorneywork |
| 2002/0120502 | A1 | 8/2002 | Sakaguchi |
| 2002/0192516 | A1* | 12/2002 | Tajima ................ G06Q 10/06 700/286 |
| 2004/0099144 | A1* | 5/2004 | Kudo .................... H05B 6/688 99/325 |
| 2004/0249655 | A1 | 12/2004 | Doeberl et al. |
| 2005/0038536 | A1 | 2/2005 | D'Mura |
| 2005/0203917 | A1 | 9/2005 | Freeberg et al. |
| 2005/0289017 | A1 | 12/2005 | Gershom |
| 2006/0011716 | A1 | 1/2006 | Perkowski |
| 2007/0050229 | A1 | 3/2007 | Tatro et al. |
| 2007/0061487 | A1 | 3/2007 | Moore et al. |
| 2007/0150371 | A1 | 6/2007 | Ganji |
| 2007/0294129 | A1 | 12/2007 | Froseth et al. |
| 2008/0195664 | A1 | 8/2008 | Maharajh et al. |
| 2008/0201305 | A1 | 8/2008 | Fitzpatrick et al. |
| 2010/0030578 | A1 | 2/2010 | Siddique et al. |
| 2010/0169290 | A1* | 7/2010 | McCoy ................ G06Q 10/08 707/705 |
| 2010/0192784 | A1 | 8/2010 | Shim et al. |
| 2010/0258643 | A1* | 10/2010 | Glielmo ............... G06Q 10/08 236/51 |
| 2010/0262449 | A1* | 10/2010 | Monteforte ............ H04W 4/20 705/7.34 |
| 2011/0006054 | A1 | 1/2011 | Garcia |
| 2011/0213667 | A1 | 9/2011 | Ierullo |
| 2012/0130548 | A1* | 5/2012 | Fadell ................. F24F 11/0012 700/278 |
| 2012/0150681 | A1 | 6/2012 | Yu et al. |
| 2012/0265694 | A1* | 10/2012 | Tuchman ............... G06Q 10/02 705/304 |
| 2013/0092032 | A1 | 4/2013 | Cafferty et al. |
| 2013/0097306 | A1 | 4/2013 | Dhunay |
| 2013/0121166 | A1* | 5/2013 | Berg .................... H04W 40/02 370/242 |

FOREIGN PATENT DOCUMENTS

| | | |
|---|---|---|
| CN | 102164526 A | 8/2011 |
| JP | 2000296904 A | 10/2000 |
| WO | 2009143109 A1 | 11/2009 |
| WO | 2011075763 A1 | 6/2011 |

OTHER PUBLICATIONS

International Search Report and Written Opinion of PCT/US2012/069816 dated Apr. 8, 2013, all enclosed pages cited.
Chapter I International Preliminary Report on Patentability of PCT/US2012/069816 dated Jun. 17, 2014, all enclosed pages cited.
International Search Report and Written Opinion of PCT/US2012/069774 dated Jun. 3, 2013, all enclosed pages cited.
International Search Report and Written Opinion of PCT/US2012/069828 dated Jun. 6, 2013, all enclosed pages cited.
Chapter I International Preliminary Report on Patentability of PCT/US2012/069828 dated Jun. 17, 2014, all enclosed pages cited.
International Search Report and Written Opinion of PCT/US2012/069788 dated Jun. 18, 2013, all enclosed pages cited.
Svennson, Martin et al., "Designing and Evaluating Kalas: A Social Navigation System for Food Recipes," ACM Transactions on Computer-Human Interaction, Sep. 2005, vol. 12, No. 3., pp. 374-400.
Extended European Search Report and Written Opinion of corresponding European Application No. 12809505.6, dated Oct. 7, 2015, all enclosed pages cited.
Extended Search Report and Written Opinion of corresponding EP application No. 12812776.8 dated Feb. 20, 2015, all enclosed pages cited.
Office Action for corresponding U.S. Appl. No. 14/363,876 dated Mar. 29, 2017.
Office Action for corresponding U.S. Appl. No. 14/362,937 dated Mar. 13, 2017.
Examination report of corresponding European application No. 12812773.5 dated Nov. 2, 2017, all enclosed pages cited.
Supplemental Search Report from corresponding Chinese application No. 201280070046.X dated Jan. 4, 2018, all enclosed pages cited.
Examination report from corresponding Chinese application No. 201280070046.X dated Jan. 12, 2018, all enclosed pages cited.
Non-Final Rejection issued in corresponding U.S. Appl. No. 16/446,771 dated Dec. 24, 2020, all enclosed pages cited.
Final Rejection issued in corresponding U.S. Appl. No. 16/446,771 dated Mar. 19, 2021, all enclosed pages cited.

* cited by examiner

DATA USAGE AND AGGREGATION IN A FOOD PRODUCT ASSET RELATED NETWORK

CROSS REFERENCE TO RELATED APPLICATIONS

This application claims the benefit of U.S. Provisional Application No. 61/576,560, filed Dec. 16, 2011, the contents of which are incorporated herein in their entirety.

TECHNICAL FIELD

Example embodiments generally relate to enterprise management and, more particularly, relate to the distribution of recipe or other food product related information associated with a particular asset in the context of a communication network.

BACKGROUND

Many food service companies are enterprises which conduct operations at numerous locations, some of which may be in different geographic regions. However, such companies often strive to provide consistency and quality across the entirety of their organization. To achieve consistency and quality, many such enterprises generate recipes and/or processes to standardize the use of equipment that is shared across the enterprise for use in food preparation.

While standardization of certain processes and/or recipes may have some advantages, it may also be desirable to foster the proliferation of creative processes and technical improvements. Moreover, many chefs are inquisitive and creative by nature as well as being familiar with the creation and consumption of content associated with modern network communication tools such as social networking sites, blogs, and/or the like. Thus, it may be desirable to implement network communication tools into enterprise management for food service companies.

BRIEF SUMMARY OF SOME EXAMPLES

Some example embodiments may provide an enterprise management system that may enable enterprise wide sharing of content to improve utilization of network assets. In one example, a particular network asset such as an oven that may employ multiple cooking sources that are electronically controlled via processing circuitry may be a focal point of such a system. In this regard, for example, ovens may be distributed to numerous customers. In some cases, a plurality of ovens may be provided to individual customers with standard (e.g., company generated) recipes and/or cooking signatures being provided to operators (e.g., chefs) from the corporate level. The operators may be enabled, either directly via the ovens or via other computer based access terminals, to communicate with each other, with the organizational leadership, or enterprise management entities in order to share content such as recipes and/or cooking signatures across the enterprise relating to the ovens. The system may therefore enable standardization to be provided by company driven dissemination of procedures, recipes and/or cooking signatures. However, feedback and process improvement data may also be easily shared throughout the system to enable synergistic cooperation across the enterprise. Furthermore, such a system may enable integration with other parties outside the organization, such as distributors, manufacturers, or even professionals from other food service companies, which could be either competitors or partners. The network asset, such as the oven, may therefore become the focal point for a network of parties that service or use the oven in one way or another to share in a cooperative experience that can be mutually beneficial to all parties.

In an example embodiment, a method for enabling network communication relating to a food preparation asset is provided. The method may include receiving, from a third party participant, a registration request to join a community including asset operators that operate at least one food preparation asset, registering the third party participant as a community member, providing the third party participant with access to a communication network for sharing information related to the asset, receiving data indicative of asset related activity, providing the third party participant with data indicative of asset related activity, and enabling the third party participant to establish communications with the asset or asset operators via the communication network based on the data indicative of asset related activity. Some or all of the operations of the method may be executed via processing circuitry configured accordingly.

In another example embodiment, a usage data analysis platform is provided. The platform may include processing circuitry having a processor and memory. The processor may be configured for receiving, from a third party participant, a registration request to join a community including asset operators that operate at least one food preparation asset, registering the third party participant as a community member, providing the third party participant with access to a communication network for sharing information related to the asset, receiving data indicative of asset related activity, providing the third party participant with data indicative of asset related activity, and enabling the third party participant to establish communications with the asset or asset operators via the communication network based on the data indicative of asset related activity.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
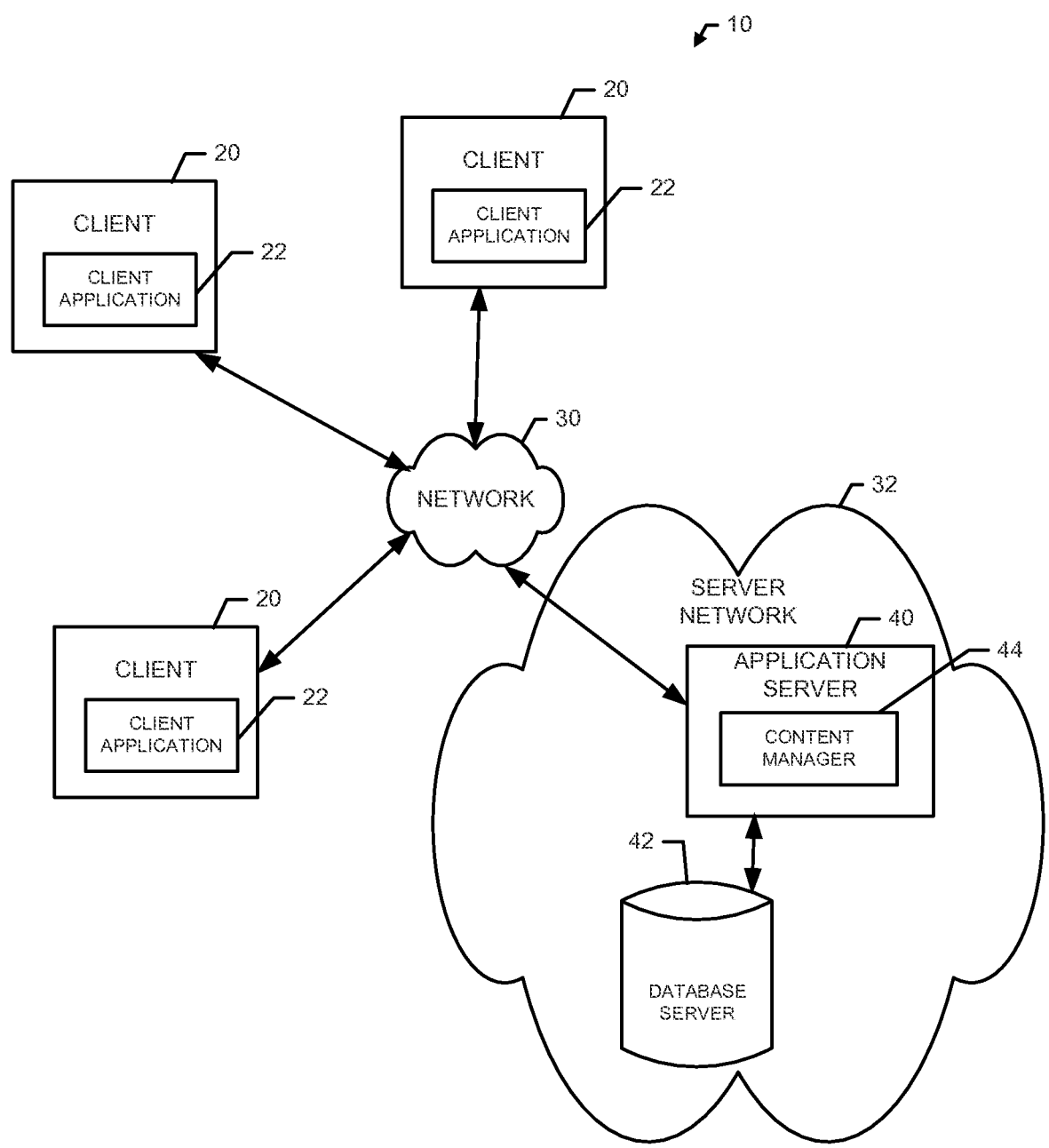
FIG. 1 illustrates a functional block diagram of a system for provision of oven related content or information according to an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, some example embodiments may provide an enterprise management system that may enable enterprise wide sharing of content to improve utilization of network assets. Moreover, some example embodiments may provide a system via which content may be shared relating to a particular network asset (e.g., food preparation related equipment such as an oven, holding cabinet, fryer, food weighing equipment, refrigerator, or other food cooling, heating or food processing appliances). The content sharing may be accomplished via a network based system employing tools enabling collaborative, instructive, and/or interactive content publication or distribution. The result of establishing the network based system may be the provision of a set of online tools that can be leveraged for enterprise level management of assets and content generated that relates to the assets. As such, for example, recipes, cooking signatures and other content created relative to the employment of the asset may be shared throughout the enterprise. Moreover, management of the asset itself (e.g., diagnostics, service, training, and/or the like) may also be accomplished using the online tools provided. In some embodiments, the enterprise may also engage distributors, customers, service organizations or other partners into synergistic partnerships relative to the asset. A complete ecosystem for interaction of all users, consumers, servicers and suppliers of the asset may therefore be provided to facilitate use, maintenance, training, distribution of supplies, and other activities that are related to the asset.

An example embodiment of the invention will now be described in reference to FIG. 1, which illustrates an example system in which an embodiment of the present invention may be employed. As shown in FIG. 1, a system 10 according to an example embodiment may include one or more client devices (e.g., clients 20). Notably, although FIG. 1 illustrates three clients 20, it should be appreciated that many more clients 20 may be included in some embodiments and thus, the three clients 20 of FIG. 1 are simply used to illustrate a multiplicity of clients 20 and the number of clients 20 is in no way limiting to other example embodiments. In this regard, example embodiments are scalable to inclusion of any number of clients 20 being tied into the system 10. The example described herein will be related to an asset comprising an oven to illustrate one example embodiment. However, it should be appreciated that example embodiments may also apply to any asset including, for example, any of the assets listed above or other food preparation related equipment.

The clients 20 may, in some cases, each be associated with a single oven, or a group of ovens, which may be owned, leased, or otherwise employed by an organization. In some embodiments, each of the clients 20 may be associated with different corresponding locations within a single food service company. For example, among the clients 20, one client may be associated with a first facility of a first organization (e.g., a food service company that prepares or cooks food using the oven) and all of the ovens of a particular type that are associated with the first facility. Meanwhile, a second client may be associated with a second facility of the first organization and all of the ovens of a particular type that are associated with the second facility. As an alternative, each client 20 may be associated with a single corresponding oven. In still other embodiments, each client 20 may actually be incorporated into respective ones of the ovens.

In other examples, some of the clients 20 may be associated with the first organization, while other ones of the clients 20 are associated with a second organization (again with individual ones clients 20 being associated with or embodied at one of the ovens, or a group of ovens. As such, in some cases, multiple clients 20 may be associated with the same organization. However, a single oven could be associated with some or all of the organizations in other embodiments.

Each one of the clients 20 may include or otherwise be embodied as computing device (e.g., a computer, a network access terminal, a personal digital assistant (PDA), cellular phone, smart phone, or the like) capable of communication with a network 30. As such, for example, each one of the clients 20 may include (or otherwise have access to) memory for storing instructions or applications for the performance of various functions and a corresponding processor for executing stored instructions or applications. Each one of the clients 20 may also include software and/or corresponding hardware for enabling the performance of the respective functions of the clients as described below. In an example embodiment, one or more of the clients 20 may include a client application 22 configured to operate in accordance with an example embodiment of the present invention. In this regard, for example, the client application 22 may include software for enabling a respective one of the clients 20 to communicate with the network 30 for requesting and/or receiving information and/or services via the network 30. Moreover, in some embodiments, the information or services that are requested via the network may be provided in a software as a service (SAS) environment. The information or services receivable at the client applications 22 may include deliverable components (e.g., downloadable software to configure the clients 20, or information for consumption at the clients 20). As such, for example, the client application 22 may include corresponding executable instructions for configuring the client 20 to provide corresponding functionalities as described in greater detail below.

The network 30 may be a data network, such as a local area network (LAN), a metropolitan area network (MAN), a wide area network (WAN) (e.g., the Internet), and/or the like, which may couple the clients 20 to devices such as processing elements (e.g., personal computers, server computers or the like) and/or databases. Communication between the network 30, the clients 20 and the devices or databases (e.g., servers) to which the clients 20 are coupled may be accomplished by either wireline or wireless communication mechanisms and corresponding communication protocols.

In an example embodiment, devices to which the clients 20 may be coupled via the network 30 may include one or more application servers (e.g., application server 40), and/or a database server 42, which together may form respective elements of a server network 32. Although the application server 40 and the database server 42 are each referred to as "servers," this does not necessarily imply that they are embodied on separate servers or devices. As such, for example, a single server or device may include both entities and the database server 42 could merely be represented by a database or group of databases physically located on the same server or device as the application server 40. The application server 40 and the database server 42 may each include hardware and/or software for configuring the application server 40 and the database server 42, respectively, to perform various functions. As such, for example, the application server 40 may include processing logic and memory enabling the application server 40 to access and/or execute stored computer readable instructions for performing various functions. In an example embodiment, one function that may be provided by the application server 40 may be the provision of access to information and/or services related to operation of the ovens with which the clients 20 are associated. For example, the application server 40 may be configured to provide cooking signatures, recipes and/or the like to clients 20 for use with the ovens associated with the clients. Alternatively or additionally, the application server 40 may be configured to provide diagnostic or troubleshooting information for servicing of the ovens, or to provide training information for procedures relating to the care or use of the ovens. In some embodiments, the application server 40 may be further configured to provide social networking type interaction among the clients 20 (e.g., posting comments, message, or content to be shared with other clients 20). In still other embodiments, the application server 40 may be configured to provide access for food manufacturers and/or distributors to publish or consume content and interact with the clients 20. As such, in at least one example, a food manufacturer or distributor may be associated with one of the clients 20.

In some embodiments, for example, the application server 40 may therefore include an instance of a content manager 44 comprising stored instructions for handling activities associated with practicing example embodiments as described herein. As such, in some embodiments, the clients 20 may access the content manager 44 online and utilize the services provided thereby relating to creation of and/or consumption of content items. However, it should be appreciated that in other embodiments, the content manager 44 may be provided from the application server 40 (e.g., via download over the network 30) to one or more of the clients 20 to enable recipient clients to instantiate an instance of the content manager 44 for local operation. As yet another example, the content manager 44 may be instantiated at one or more of the clients 20 responsive to downloading instructions from a removable or transferable memory device carrying instructions for instantiating the content manager 44 at the corresponding one or more of the clients 20. In such an example, the network 30 may, for example, be a peer-to-peer (P2P) network where one of the clients 20 includes an instance of the content manager 44 to enable the corresponding one of the clients 20 to act as a server to other clients 20. In still other embodiments, a computer terminal associated with a network operator (which may be a client 20 or another access terminal) may access the content manager 44 to perform functionality associated therewith.

In an example embodiment, the application server 40 may include or have access to memory (e.g., internal memory or the database server 42) for storing instructions or applications for the performance of various functions and a corresponding processor for executing stored instructions or applications. For example, the memory may store an instance of the content manager 44 configured to operate in accordance with an example embodiment of the present invention. In this regard, for example, the content manager 44 may include software for enabling the application server 40 to communicate with the network 30 and/or the clients 20 for the provision and/or receipt of information associated with performing activities as described herein. Moreover, in some embodiments, the application server 40 may include or otherwise be in communication with an access terminal (e.g., a computer including a user interface) via which enterprise managers may interact with, configure or otherwise maintain the system 10. In an example embodiment, the enterprise managers may be associated with a distributor of the ovens. As such, for example, the oven distributor may maintain the system 10 for facilitating interaction of all parties related to the operation of the ovens.

As such, the environment of FIG. 1 illustrates an example in which provision of content and information associated with the ovens may be accomplished by a particular entity (namely the content manager 44 residing at the application server 40) that may act as a content distribution platform relative to a plurality of assets (e.g., ovens). However, it should be noted again that the content manager 44 could alternatively handle provision of content and information within a single organization. Thus, in some embodiments, the content manager 44 may be embodied at one or more of the clients 20 and, in such an example, the content manager 44 may be configured to handle provision of content and information associated with ovens that are associated only with the corresponding single organization.

Figure 2:
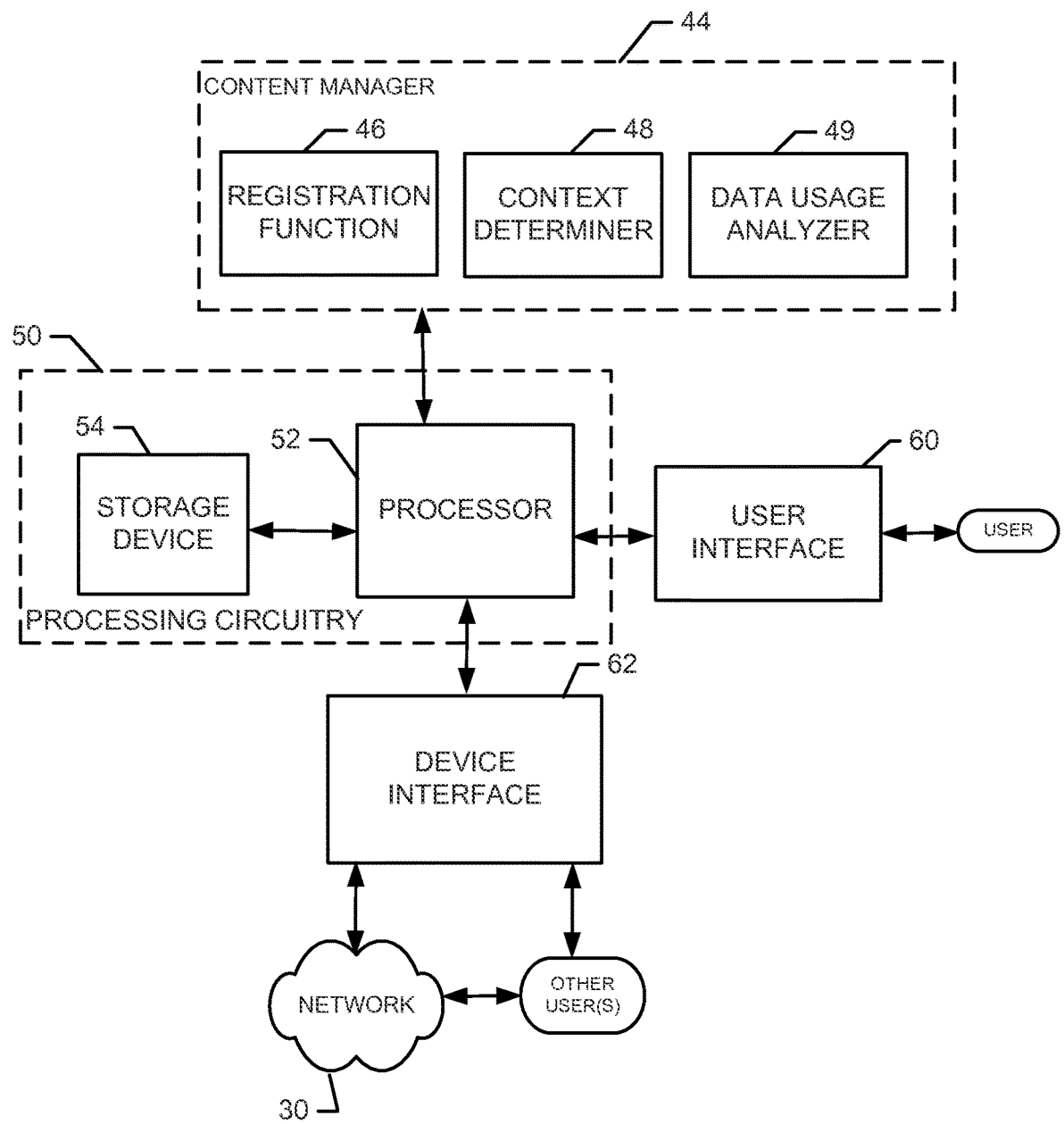
FIG. 2 illustrates a functional block diagram of an apparatus for provision of oven related content or information according to an example embodiment.

An example embodiment of the invention will now be described with reference to FIG. 2. FIG. 2 shows certain elements of an apparatus for provision of food preparation related content or information to an asset such as an oven or one of the other assets mentioned above according to an example embodiment. The apparatus of FIG. 2 may be employed, for example, on a client (e.g., any of the clients 20 of FIG. 1) or a variety of other devices (such as, for example, a network device, server, proxy, or the like (e.g., the application server 40 of FIG. 1)). Alternatively, embodiments may be employed on a combination of devices. Accordingly, some embodiments of the present invention may be embodied wholly at a single device (e.g., the application server 40 or one or more clients 20) or by devices in a client/server relationship (e.g., the application server 40 and one or more clients 20). Furthermore, it should be noted that the devices or elements described below may not be mandatory and thus some may be omitted in certain embodiments.

Referring now to FIG. 2, an apparatus for provision of food preparation related content or information is provided.

The apparatus may be an embodiment of the content manager 44 or a device hosting the content manager 44 to facilitate content distributions. As such, configuration of the apparatus as described herein may transform the apparatus into the content manager 44 so that the content manager 44 may function as a content distribution platform. In an example embodiment, the apparatus may include or otherwise be in communication with processing circuitry 50 that is configured to perform data processing, application execution and other processing and management services according to an example embodiment of the present invention. In one embodiment, the processing circuitry 50 may include a storage device 54 and a processor 52 that may be in communication with or otherwise control a user interface 60 and a device interface 62. As such, the processing circuitry 50 may be embodied as a circuit chip (e.g., an integrated circuit chip) configured (e.g., with hardware, software or a combination of hardware and software) to perform operations described herein. However, in some embodiments, the processing circuitry 50 may be embodied as a portion of a server, computer, laptop, workstation or even one of various mobile computing devices. In situations where the processing circuitry 50 is embodied as a server or at a remotely located computing device, the user interface 60 may be disposed at another device (e.g., at a computer terminal or client device such as one of the clients 20) that may be in communication with the processing circuitry 50 via the device interface 62 and/or a network (e.g., network 30).

The user interface 60 may be in communication with the processing circuitry 50 to receive an indication of a user input at the user interface 60 and/or to provide an audible, visual, mechanical or other output to the user. As such, the user interface 60 may include, for example, a keyboard, a mouse, a joystick, a display, a touch screen, a microphone, a speaker, a cell phone, or other input/output mechanisms. In embodiments where the apparatus is embodied at a server or other network entity, the user interface 60 may be limited or even eliminated in some cases. Alternatively, as indicated above, the user interface 60 may be remotely located.

The device interface 62 may include one or more interface mechanisms for enabling communication with other devices and/or networks. In some cases, the device interface 62 may be any means such as a device or circuitry embodied in either hardware, software, or a combination of hardware and software that is configured to receive and/or transmit data from/to a network and/or any other device or module in communication with the processing circuitry 50. In this regard, the device interface 62 may include, for example, an antenna (or multiple antennas) and supporting hardware and/or software for enabling communications with a wireless communication network and/or a communication modem or other hardware/software for supporting communication via cable, digital subscriber line (DSL), universal serial bus (USB), Ethernet or other methods. In situations where the device interface 62 communicates with a network, the network may be any of various examples of wireless or wired communication networks such as, for example, data networks like a Local Area Network (LAN), a Metropolitan Area Network (MAN), and/or a Wide Area Network (WAN), such as the Internet.

In an example embodiment, the storage device 54 may include one or more non-transitory storage or memory devices such as, for example, volatile and/or non-volatile memory that may be either fixed or removable. The storage device 54 may be configured to store information, data, applications, instructions or the like for enabling the apparatus to carry out various functions in accordance with example embodiments of the present invention. For example, the storage device 54 could be configured to buffer input data for processing by the processor 52. Additionally or alternatively, the storage device 54 could be configured to store instructions for execution by the processor 52. As yet another alternative, the storage device 54 may include one of a plurality of databases (e.g., database server 42) that may store a variety of files, contents or data sets. Among the contents of the storage device 54, applications (e.g., client application 22 or service application 42) may be stored for execution by the processor 52 in order to carry out the functionality associated with each respective application.

The processor 52 may be embodied in a number of different ways. For example, the processor 52 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 52 may be configured to execute instructions stored in the storage device 54 or otherwise accessible to the processor 52. As such, whether configured by hardware or software methods, or by a combination thereof, the processor 52 may represent an entity (e.g., physically embodied in circuitry) capable of performing operations according to embodiments of the present invention while configured accordingly. Thus, for example, when the processor 52 is embodied as an ASIC, FPGA or the like, the processor 52 may be specifically configured hardware for conducting the operations described herein. Alternatively, as another example, when the processor 52 is embodied as an executor of software instructions, the instructions may specifically configure the processor 52 to perform the operations described herein.

In an example embodiment, the processor 52 (or the processing circuitry 50) may be embodied as, include or otherwise control the content manager 44, which may be any means such as a device or circuitry operating in accordance with software or otherwise embodied in hardware or a combination of hardware and software (e.g., processor 52 operating under software control, the processor 52 embodied as an ASIC or FPGA specifically configured to perform the operations described herein, or a combination thereof) thereby configuring the device or circuitry to perform the corresponding functions of the content manager 44 as described below.

The content manager 44 manager may include tools to facilitate the creation and distribution of content via the network 30. In an example embodiment, the content manager 44 may also be configured to manage the provision of access to various parties attempting to employ services provided via the application server 40. Thus, for example, the content manager 44 may be configured to receive queries for information and determine whether the party providing the query has been granted access to receive the information. The content manager 44 may then either fulfill or route requests that are authorized appropriately so they can be fulfilled. The content manager 44 may further be configured to receive data provided thereto and store such data for access by other parties according to the classification of the data, the access restrictions associated with the data, the type of data, or other content management rules that may be defined within the content manager 44. In some embodiments, devices or clients attempting to interface with the content manager 44 may be required to identify themselves with a login and password or other identifying means, which may then be used to determine the access that is appropriate for the corresponding devices or clients. In some cases, certain functionalities executable via the content manager 44 may also only be offered to certain parties, and therefore the content manager 44 may also be enabled to restrict certain performance capabilities of the application server 40 to authorized users. In an example embodiment, parties may subscribe to be members of a service managed by the content manager 44 and restrictions may be applied to service subscribers based on their respective subscriptions.

The content manager 44 may include a registration function 46 that receives electronic information identifying receivers of an asset (e.g., an oven). The registration function 46 may record identifying information of the receiver (e.g., organization name, location, etc.) and identifying information of the asset (e.g., oven model number, software or firmware version information, and/or the like). In cases where multiple assets are associated with the same organization, a listing may be recorded of all of the assets associated with the corresponding organization. In some cases, the listing may be organized by location and/or function. The registration function 46 may register the receiver as a community member and distribute community member service descriptions, login information and/or the like to email addresses of the community member. Any applicable access restrictions that apply to the community member may be assigned, and access may be provided thereafter to all accessible content and/or services for which the community member is authorized access via the system 10. Individuals associated with a community member may further register as individuals associated with the community member and may receive access to the corresponding content and/or services that are applicable to the community member with which they are associated. In some embodiments, profile information may be gathered regarding individuals or the community member as a whole. The profile information may, in some cases, be used to determine access levels for the community member or individual, or may be used for determining which services or content to inform the corresponding community member or individual about when a login occurs. Vendors (e.g., food distributors and/or manufacturers) may also be registered as such by the registration function and may receive access to content and/or permission to post content based on access restrictions that may be defined upon registration. In some embodiments, the vendors may also receive exposure to certain information about community members relating to the asset, to identify leads or possible interaction opportunities with specific community members or individuals.

In some embodiments, the registration function 46 may further manage subscription levels and corresponding access restrictions that apply based on the subscription level of a community member or vendor. In cases where subscriptions are applicable, the level of subscription of a community member or vendor may be used to determine the content to which the corresponding community member or vendor has access. The subscription level may also or alternatively determine which content creation tools or services (e.g., enhanced or smart services) to which the community member or vendor will have access. Furthermore, in some cases, the subscription level may determine the type and/or amount of information that a vendor may receive about community members or individuals. Subscription level may also be used in other ways, or no subscription level may be defined at all in some embodiments.

In some embodiments, the content manager 44 may further include a context determiner 48 that may be configured to determine context information associated with a particular asset so that content items (or libraries) that will be presented to the particular asset (or an operator associated with the particular asset) can be tailored to the context of the particular asset or entity with which the particular asset is associated. The context information may include geographic location, equipment registered to a community member (e.g., model, type, version, etc.), operator identity, entity identity, seasonal considerations, preferences (e.g., favored distributors, chefs, product lines, and/or the like), upcoming holidays, weather, fault indications, training schedules, and/or the like. The context determiner 48 may query equipment associated with the community member and/or may reference profile information associated with the community member to determine any applicable context information and provide content item recommendations, libraries or access to content items or libraries based at least in part on the context information determined.

Accordingly, as indicated above, the content manager 44 may facilitate two way communications with assets (e.g., ovens or other food preparation equipment) and/or with computer terminals or other clients that may be associated with the assets either directly or indirectly. The two way communication may include content item creation and distribution so that some terminals (e.g., clients 20) may generate content items using the content manager 44 and distribute or otherwise make such content items available for distribution via the content manager 44. Thus, communication in one direction into the content manager 44 may be used to facilitate content creation, and then communication in the opposite direction may be used to distribute the content that was created. In some cases, additionally or alternatively, two way communications may be employed relative to the receipt of data from clients 20 (e.g., assets or terminals associated with assets) to determine context information and the use of the context information to facilitate the provision of services or content based on the asset or operator context. In still other example embodiments, the two way communications may also or alternatively involve the provision of data from clients 20 to the content manager 44 for data aggregation, process management, inventory management and/or the like based on the use of tools for analyzing the data, and then the provision of services based on the analyzed data.

In some embodiments, the content manager 44 may therefore further include a data usage analyzer 49 to facilitate handling the data analysis and corresponding functionality that may be enabled or otherwise associated therewith. The data usage analyzer 49 may be any means such as a device or circuitry operating in accordance with software or otherwise embodied in hardware or a combination of hardware and software thereby configuring the device or circuitry to perform the corresponding functions of the data usage analyzer 49 as described herein. In an example embodiment, the data usage analyzer 49 may be configured to receive data related to assets (e.g., data indicative of asset related activity). The data may be asset operational data (e.g., oven or other food processing device operational data) related to production, maintenance, inventory, process management or the like. Thus, in some cases, the data may be indicative of product usage to determine which specific food products are most commonly produced and the corresponding impacts of that production on inventory levels and oven maintenance. In some embodiments, the data may also or alternatively relate to oven or other asset usage. Thus, for example, the data may also indicate, for a given product, the specific recipes, cooking signatures, or other asset parameters employed in association with production to identify favorite or most commonly used content items. The data may also or alternatively be indicative of operator activity such as search activity, promotion participation, download activity and/or patterns, and/or the like. Each of these various types of data may be gathered and provided to the data usage analyzer 49 for aggregation and/or analysis in association with one or more aggregation and/or analytical algorithms that may enable functionality designed to use the analyzed data.

In an example embodiment, the analyzed data may be used for a particular organization to identify process improvement opportunities related to correction of inefficiencies or other streamlining. For example, the data may identify that a particular recipe and/or cooking signature is being used to prepare a particular food product, but an alternative recipe and/or cooking signature could be employed for the same food product using fewer ingredients or ingredients that can be obtained cheaper from a different source. In other examples, process data may identify that better inventory management or product ordering practices may cut costs or improve availability.

In some embodiments, data may be organized and/or displayed by asset, operator (or chef), location, organization or any other desirable entity type. Benchmarking or other comparison tools may then be employed to compare the data generated by different entities of a same type to identify entities (e.g., assets, operators, locations, or organizations) that are more or less efficient or productive than others. The processes, recipes, operations, training, or other factors employed at each respective entity type may then be analyzed or standardized in order to improve performance. The data and benchmarking capabilities may be limited to a particular organization (or entity type) using only the data generated by the corresponding organization or entity type. However, in some cases, benchmarking may be accomplished using data also from other organizations or entity types.

In an example embodiment, community members may submit their data to be aggregated into a data pool. The aggregated data may therefore be anonymously submitted and pooled together with data from other community members that have elected to submit their data to the pool. Each community member may then have the opportunity to benchmark their data against the data in the pool. In some cases, the pools may be defined based on product, location, industry, or any other suitable basis. Thus, for example, a bakery may benchmark their data associated with asset operation against data that is pooled from other bakeries. Alternatively, oven owners may benchmark their data associated with a particular oven model against pool data from other owners/operators of the same oven model. In still other examples, asset operators in a particular geographic region may benchmark their operational data against that of other asset operators in the same (or different) geographic regions. Any of a plurality of different types of data may be aggregated for pooling according to any of a plurality of different entity types so that any particular operator may be able to (subject perhaps to permissions and authorizations) generate benchmarking comparisons for the operator to use for drawing conclusions or receiving recommendations regarding business related improvements that could be implemented to improve the performance of the operator, asset, or the organization of the operator relative to benchmark levels.

In some embodiments, entities outside of a particular organization (i.e., third party participants) may also utilize data that is reported or aggregated in relation to the assets of the organization. As an example, search and/or download data associated with a particular organization or operator may be reported in order to enable marketers or suppliers to identify targets that would likely have a need or interest in the products or services that the marketers or suppliers can provide. In some cases, the data may be raw data indicating specific searches or downloaded content items. However, in other cases, the data usage analyzer 49 may be configured to characterize the data without passing along actual raw data in order to preserve confidentiality and/or privacy. Thus, the data provided to third party participants may be illustrative of a type of activities with which an operator or organization has been associated and a volume or frequency of the activity, without providing specific details regarding the activity. For example, the data usage analyzer 49 may provide a baking product supplier with data usage information indicating that a particular organization conducts 67% of their searches for cake related recipes, and 22% of their downloaded recipes are for cupcake recipes. The third party participant may then target baked good ingredients and/or recipes that include baked good ingredients marketed by the third party participant to the particular organization.

In some embodiments, services may be provided on the basis of usage data gathered by the data usage analyzer 49. In this regard, for example, run hours of equipment may be monitored relative to preventive maintenance standards. The organization may then be provided with alerts (e.g., via email or other communication methods) to indicate that maintenance is due. Alternatively or additionally, contact may be initiated by service personnel or content items including advertisements or offers relating to maintenance or other services may be provided based on data indicating that preventive or corrective maintenance is appropriate. Thus, the data usage analyzer 49 may provide third party participants with data or information regarding community member activity relating to the asset. The information may be used by the third party participants to create pitch materials, generate leads or otherwise establish or attempt to establish communication channels with the community members in a targeted way.

Usage data gathering may be conducted in real time in some embodiments. Thus, for example, asset and/or operator activities may be monitored in real time with reports on activities being fed through the network 30 as the activities occur. However, in some embodiments, activities may be monitored locally and a usage file may be generated to indicate usage data over a period of time. The usage file may then be transmitted via the network 30 at periodic intervals, in response to specific requests, or in response to certain activities. In still other embodiments, usage data could be loaded onto a removable memory device and provided to the data usage analyzer 49 via the removable memory device.

The content manager 44 may define a content distribution platform via which numerous parties may interact relative to activities and/or content items associated with a particular oven. In an example embodiment, the oven may be an oven capable of employing more than one energy source in a controlled manner. In this regard, for example, the oven may be enabled to heat food at least partially using radio frequency (RF) energy. In one embodiment, the oven may be configured to generate RF energy at selected levels over a range of 800 MHz to 1 GHz and may include an antenna assembly configured to transmit the RF energy into a cooking chamber of the oven and receive feedback to indicate absorption levels of respective different frequencies in the food product. The absorption levels may then be used, at least in part, to control the generation of RF energy to provide balanced cooking of the food product. Meanwhile, in some cases, airflow that may be provided may be heated to enable browning to be accomplished as well. Other or additional heat sources may also be included.

In an example embodiment, the oven may be controlled, either directly or indirectly, by a cooking controller. The cooking controller may be configured to receive inputs descriptive of the food product and/or cooking conditions in order to provide instructions or controls to the energy sources employed by the oven to control the cooking process. In some embodiments, the cooking controller may be configured to access data tables that define RF cooking parameters used to drive an RF generator to generate RF energy at corresponding levels and/or frequencies for corresponding times determined by the data tables based on initial condition information descriptive of the food product. The cooking controller may further be configured to enable the oven to communicate with other ovens and/or with external devices via wireless or wired connections (e.g., via network 30). Alternatively, the cooking controller may be configured to enable a removable device to be installed to allow data and/or instructions to be uploaded to the oven, and/or allow data to be downloaded from the oven. Cooking signatures, recipes and other data may therefore be communicated to and/or from the ovens in any of these manners.

In the context of the present disclosure, a recipe should be understood to define the cooking materials to be used for preparation of a food product and corresponding instructions to be carried out by an operator or chef relative to preparing the food product. Thus, for example, the recipe may provide a list of ingredients, mixing and/or preparation instructions for the operator or chef, and/or oven settings and cooking times for the operator or chef to follow. Meanwhile, a cooking signature should be understood to relate to specific machine instructions relating to execution of the preparation of the food product for the oven to employ. Thus, the cooking signature may, in some cases, not include any human readable code, but may instead simply include machine executable instructions for operation of the oven relative to preparing a desired food product. Accordingly, the recipe may provide operator or chef instructions that are visible or readable by the operator or chef, and the cooking signature may provide machine instructions for defining cooking parameters or sequences that may be invisible or unreadable by the operator or chef. The recipe and cooking signature may be used together to define a superior prepared food product by enabling the operator or chef to conduct the macro level activities associated with preparing the food product and enabling the oven itself to conduct specifically tailored or defined cooking operations that optimize the results achievable via operation of the oven.

In an example embodiment, the cooking controller may include processing circuitry configured to receive an indication of cooking parameters entered by an operator of the oven where the cooking parameters define at least a food product category of the food product. The cooking controller may then be configured to select a cooking signature corresponding to the food product category. The cooking signature may include information descriptive of inherent properties of the food product category and input response properties defining one or more sets of instructions associated with a cooking sequence for the food product based on the cooking parameters. As such, while a recipe may generally identify ingredients, quantities associated with the ingredients, and basic cooking times and processing techniques, a cooking signature may take into account the inherent properties of the ingredients themselves to enable the dynamic controlling of the hardware (and software in some cases) used to control cooking processes in the oven. As such, a cooking signature may be specifically tied to a corresponding platform (e.g., a specific oven) since the cooking signature may include specific cooking instructions based on the capabilities of the oven relative to expected interactions between the cooking processes of the oven and the specific food products being cooked in the oven. In some cases, a recipe may further include one or more cooking signatures.

The content manager 44 may therefore provide a central repository for content and services related to the ovens including acting as a storage and distribution center for recipes and/or cooking signatures. However, other content and utility may also be provided by the content manager 44 and, as indicated above, the content manager 44 may enable the creation of an ecosystem via which interactions related to the ovens may be fostered. The ecosystem may include a plurality of communication flow paths facilitated by the content manager 44. Moreover, in some embodiments, in connection with providing a SAS environment related to the oven, the content manager 44 may provide a cloud library via which information may be provided for consumption by authorized parties.

Figure 3:
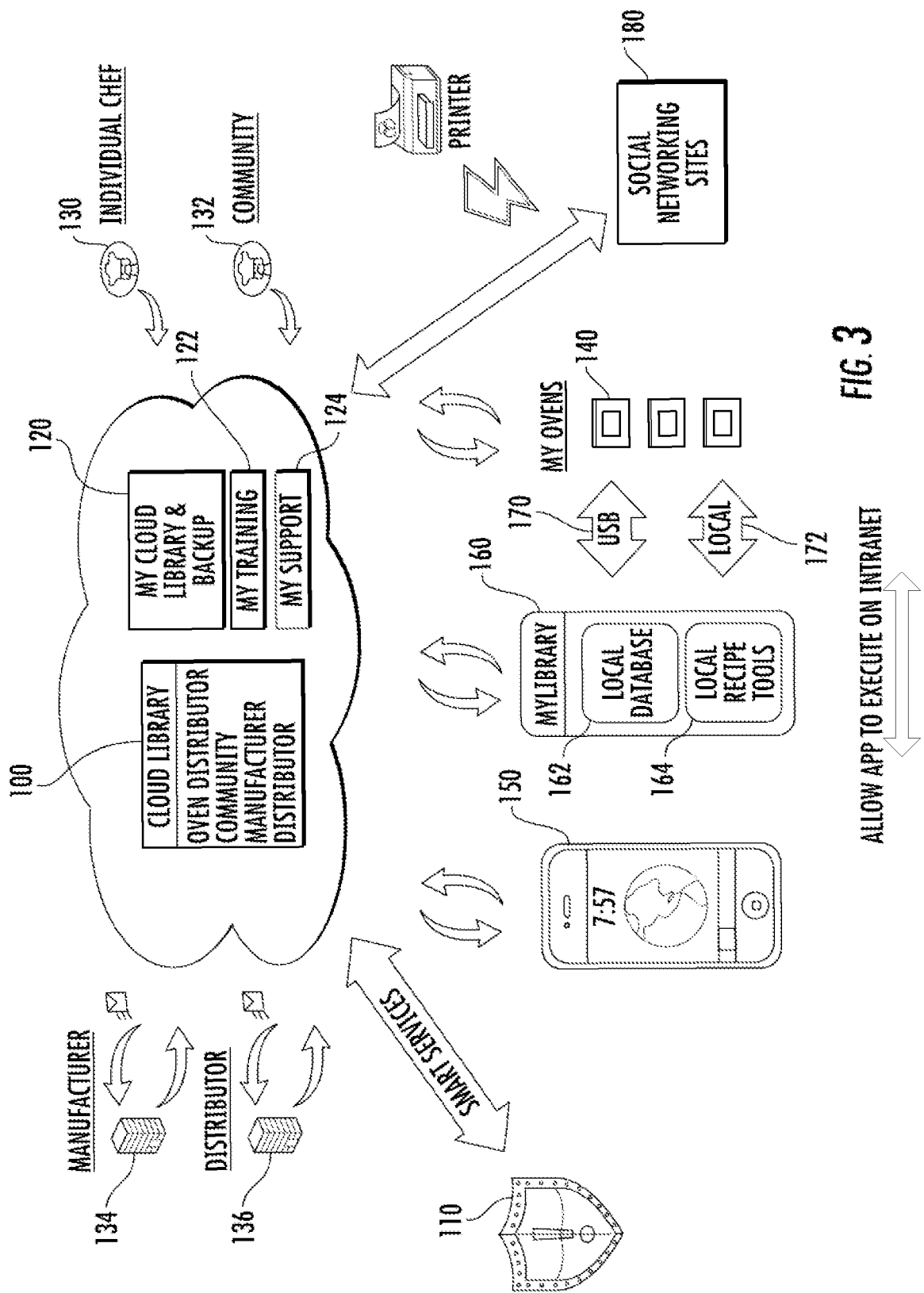
FIG. 3 illustrates a set of communication flow paths that may be enabled by the system of FIG. 1 according to an example embodiment.

FIG. 3 illustrates a set of communication flow paths that may be enabled by the system of FIG. 1 according to an example embodiment. In this regard, FIG. 3 illustrates several of the access mechanisms that may be employed to provide content to the content manager 44 or receive distributed content from the content manager 44. Moreover, FIG. 3 also illustrates an example of how some content may be organized for access and/or use according to one exemplary embodiment.

The content manager 44 may be provided within a SAS context. As such, the content manager 44 may essentially reside in "the cloud", as shown in FIG. 3. Communications between the content manager 44 and other entities may, in some cases, be protected by a firewall. In some examples, the content manager 44 may define public and private cloud sections. In this regard, a public section may be exemplified by a cloud library 100 that may be accessible to all community members (e.g., the oven distributor and enterprise manager, customers, food manufacturers, food distributors, and/or the like). The cloud library 100 may therefore include recipes and/or cooking signatures that are provided for general consumption to all users of the ovens.

In some cases, the cloud library 100 may further include content related to various smart services 110 such as troubleshooting or diagnostic services. As such, for example, operational data may be uploaded to the cloud library 100 by a community member for analysis, community member may navigate troubleshooting flowcharts, or online chat may be conducted with technicians to diagnose and resolve technical issues. Access to smart services 110 may enable remote configuration of the ovens, the provision of software or firmware updates, and/or the provision of services based on usage or operational data. Usage data (e.g., products being cooked in the ovens and methods used to cook such products) may be used to identify related products, recipes, cooking signatures or improvements to products, recipes or cooking signatures. Operational data may be used to provide predictive failure analysis to suggest preventive maintenance or measures and/or provide content or service related to such measures. Remote troubleshooting and/or servicing may also be employed in connection with smart services 110 by engaging offsite personnel with knowledge of the specific equipment located onsite. Oven status updates may also be provided in connection with smart services 110. Accordingly, smart services 110 may be provided and/or supported to greatly expand the ability of community members to perform and receive assistance relative to performance of asset management.

Remote configuration of ovens (or other assets) may be accomplished on an individual or group basis. Moreover, a particular organization that is a community member (e.g., a restaurant chain) may define configurations for all or a portion of its ovens so that the ovens can be configured remotely in a consistent manner. The configurations may be accomplished on an individual basis during startup of a new oven (e.g., so that the new oven has the same configuration as other deployed ovens). Alternatively or additionally, the configurations may be accomplished on an organization-wide basis as a part of an upgrade or maintenance related activity. Preferences and other settings may therefore be provided with some form of consistent default across the organization. However, in some cases, chefs may be enabled to define particular preferences or settings (some of which may be shared or published for comment as is also described herein) to tailor the ovens, or their own profiles, to their specific needs or desires.

In some embodiments, the content manager 44 may be enabled to also define private cloud sections so that individual community members may have their own respective libraries or cloud sections (e.g., My Cloud Library 120, My Training 122 and My Support 124). Private cloud sections may be used by a particular organization (i.e., a community member) to provide contents such as recipes and/or cooking signatures (e.g., in My Cloud Library 120) that are specific to the organization. Access to private cloud sections may be limited to the organization and those invited by the organization. In some embodiments, one or more of the private cloud sections may even exclude the system administrator or enterprise manager from access.

Other sections (e.g., My Training 122 and My Support 124) may include content that is specific to the hardware and/or software modules employed by the particular organization and may be interactive or otherwise cooperatively maintained with the enterprise manager or system administrator. For example, when new ovens are purchased by a community member, the community member's private training and support sections may be updated to include training materials and support related materials that are specific to the new oven models. The materials may include, for example, training videos, equipment manuals or other training material that is specifically associated with the actual equipment that the community member has registered or purchased. As such, community members do not need to navigate through a plurality of training or service manuals to find those that apply to the equipment employed by the particular organization with which they are affiliated. Instead, the training and support manuals that are applicable to the equipment employed by the particular organization will be known to the system and provided to community members seeking training or support. In other words, the content manager 44 may provide global access to all community members for some content, while private sections specific to some (e.g., based on subscription level) or all members be provided for more personalized content and/or services. Online chatting with service personnel and other owner relations services may also be provided in connection with smart services 110 or in connection with specific cloud sections tailored to the provision of corresponding specific services.

As shown in FIG. 3, parties that may interact with the system may include individual chefs 130, community members 132 (e.g., customers or purchasers of ovens) on an entity wide basis, manufacturers 134 (e.g., makers of food products that can be cooked in the ovens), and distributors 136 (e.g., companies that distribute the food products produced by the manufacturers). Manufacturers 134 and distributors 136 may be examples of third party participants that may publish content to the cloud library 100, or in some cases, directly to specific individual chefs 130 and/or community members 132. These parties may have reading capabilities for content in the public portions of the cloud (e.g., the cloud library 100) and for content provided by entities that have given them access. These parties may also themselves generate and publish content to the public portions of the cloud and to any entities that have given them access.

In some embodiments, ovens 140 themselves may be enabled to interact with the content manager 44. However, in other embodiments, the ovens 140 may interact with mobile client devices 150 or fixed client devices 160 via any of various communication methods (e.g., USB 170, local network communications 172, Internet, intranet, LAN, etc.). Moreover, the fixed client devices 160 may include local databases 162 and/or local recipe generation tools 164. Content may be selectively uploaded/downloaded or exchanged between the cloud library 100, My Cloud Library 120, and the local databases 162. In some embodiments, an application may be provided that may be run on a smart phone or other mobile communication device (e.g., mobile client device 150) so that the local databases 162 and/or local recipe generation tools 164 may be accessed, or content in the cloud may be accessed. Content may be printed, posted, shared, downloaded, uploaded, or otherwise exchanged via the content manager 44 according to any applicable restrictions defined for the corresponding content or community member.

Using the tools provided via the example systems shown in FIGS. 1 and 3, various libraries of recipes and products may be provided. Publicly available libraries may be placed in the cloud library 100. However, private libraries may be placed in My Cloud Library 120 or other restricted access locations. In some cases, manufacturers and distributors may provide their own respective libraries (e.g., vendor libraries) that include recipes (and in some cases also corresponding cooking signatures) that include products from the respective food manufacturers or distributors. In some cases, the recipes may include private label distributor items. The vendor libraries may be publicly available in some embodiments. However, in other cases, the vendor libraries may be provided to private cloud sections of specific customers of respective vendors.

In an example embodiment, the oven distributor or enterprise manager may also create recipes (and/or cooking signatures) for public distribution via a community library. The community library may also host content from featured chefs, sponsors, or other parties that may be engaged by the enterprise manager. Other community members (e.g., oven users) or individual chefs that desire wide dissemination of their content may also publish content to the community library in some embodiments. In some cases, the community library may be synonymous with the cloud library 100 and may be fully public. However, in other embodiments, the cloud library 100 may include some exclusive portions that have subscription based or other access limitations. For example, oven purchasers may automatically receive a basic subscription that provides access to public forums and enables the purchaser to set up certain private libraries and functions tailored to the specific equipment purchased. Meanwhile, higher level subscription purchasers may be entitled to access to restricted access libraries. The restricted access libraries may be associated with featured chefs, sponsored products, enhanced services, and/or the like.

Private libraries may be maintained on an organizational or even individual level. In some cases, any organization may be enabled to set up private libraries for the storage of content (e.g., recipes and/or cooking signatures) that is either generated by or within the corresponding organization. The private libraries may also store content acquired from the vendor libraries or the community library for easy access. Organizations may also allow (or their accounts may be setup accordingly to allow) individuals within the organization (e.g., chefs, managers and/or the like) to store content in their own individual private libraries. Privacy levels may be established as desired by the organization. For example, the organization may enable selected individuals or selected other community members to have access to the organization's private libraries. Alternatively or additionally, the organization may restrict access to just people associated with the organization (including excluding access to the enterprise manager). Accordingly, a community member that uses the system 10 to distribute and/or standardize recipes, cooking signatures, procedures, etc., may be enabled to confidentially distribute such information. Meanwhile, a community member that seeks to actively promote their products and/or brands may open access (or target access) to potential customers or consumers. In some embodiments, signing into the system 10 (e.g., with a login and password) may automatically provide for access to the public library and any private libraries to which the logged in user is admitted. Alternatively, some private libraries may require separate secure logins.

In some embodiments, content within certain libraries or specifically identified content within any particular library may be submitted for public comment. For example, recipes or cooking signatures may be submitted in a public forum for comment or review. Reviewers may submit comments, make recommendations for modifications, submit questions, provide ratings, or request product and/or product information associated with content posted for review. In some embodiments, preformatted feedback or order forms may be generated responsive to selection of an option to provide feedback or comment with respect to content posted in a public library. The preformatted forms may then be submitted to provide feedback or solicit information or products. In other embodiments, existing social network platforms 180 may be integrated (e.g., Facebook, Twitter, LinkedIn, etc.) into the system 10. As such, although the system 10 itself may be set up in a manner that is similar to a social network, in some cases the system 10 may also interact with other social networks to enable integration with the message posting, status updating, and/or professional engagement that is facilitated by other social networks.

In an example embodiment, some of the content that may be posted in the libraries (e.g., in the vendor library) may be associated with particular manufacturers or distributors and may be associated with specific brand name products. Meanwhile, content generated by the oven distributor or enterprise manager, and content generated by community members or other individuals may not be associated with specific brand name products. Thus, in some cases, content items including recipes or other products may be different depending upon the source of the content. In an example embodiment, content items including products or recipes that are associated with a particular manufacturer or distributor (e.g., a third party participant) may include an identifier (e.g., logo, brand symbol, and/or the like) of the corresponding third party participant along with a title of the product/recipe and a description provided by the entity. Recipes may include cooking signatures for use in the oven around which the system is setup in some cases as well. Thus, for example, third party participants may design recipes including their products and may provide specific machine instructions defining cooking sequences responsive to instructions that are specific to control of the asset (e.g., oven). In other words, the content items provided by the third party participants may be tailored specifically to the equipment to be used for preparing the food product associated with the recipe provided in a content item. The specific tailoring may refer to the fact that machine code specific to the oven or other asset (i.e., not generally or generically executable by any oven, but specifically readable by the corresponding oven for which the code is written) is included.

In some cases, the product or recipe may also include a photo and/or pitch materials, or even a distributor call to action. Other community member generated products or recipes may include a product title and description along with a photo and full recipe. If applicable, a cooking signature may also be included. Authorship information may be included to identify the source of the product or recipe/signature. Printing functionality may also be provided to enable readers to print desired recipes.

Figure 4:
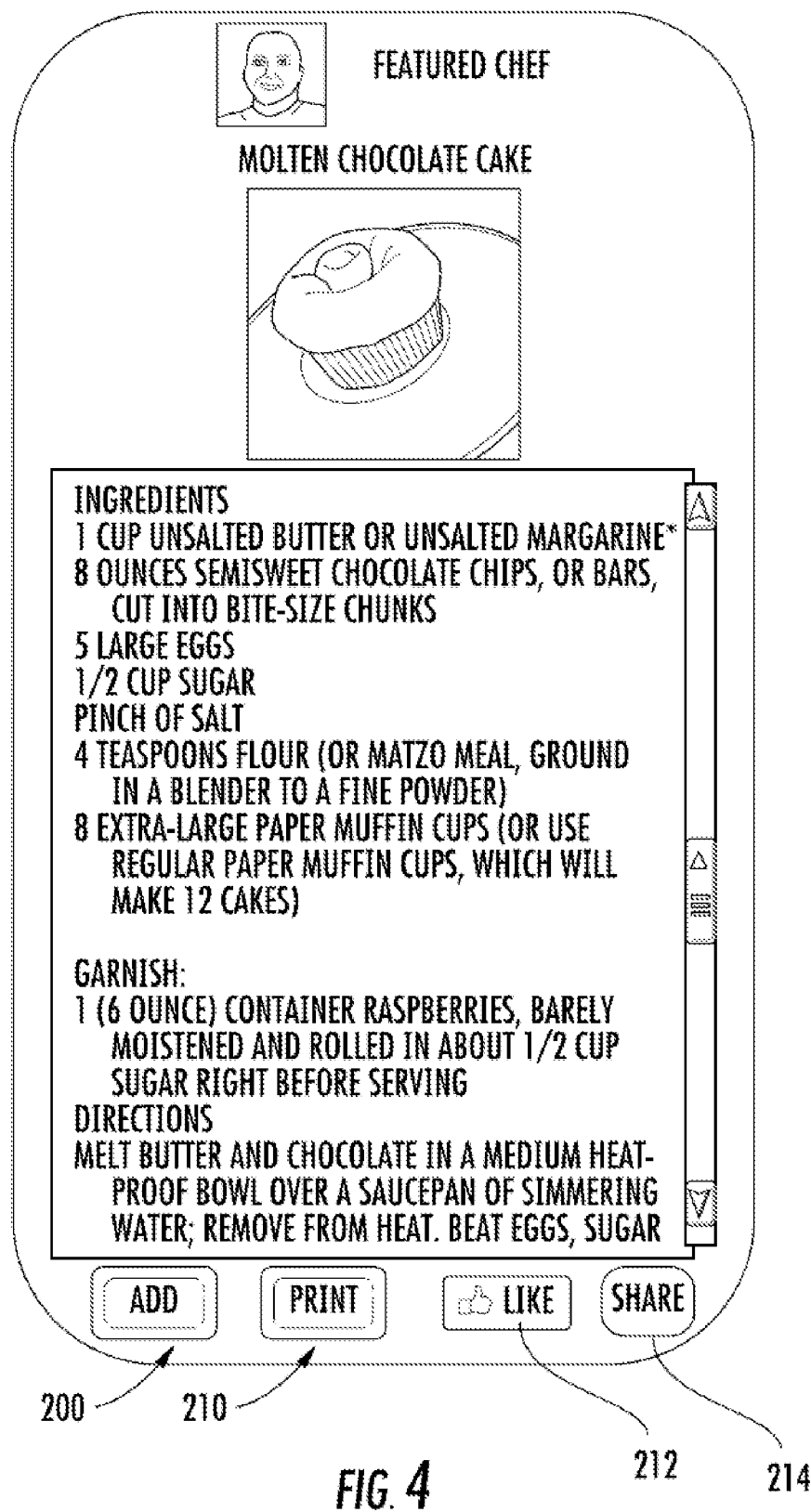
FIG. 4 illustrates an example of a recipe that may be provided by a featured chef or other community member according to an example embodiment.
Figure 5:
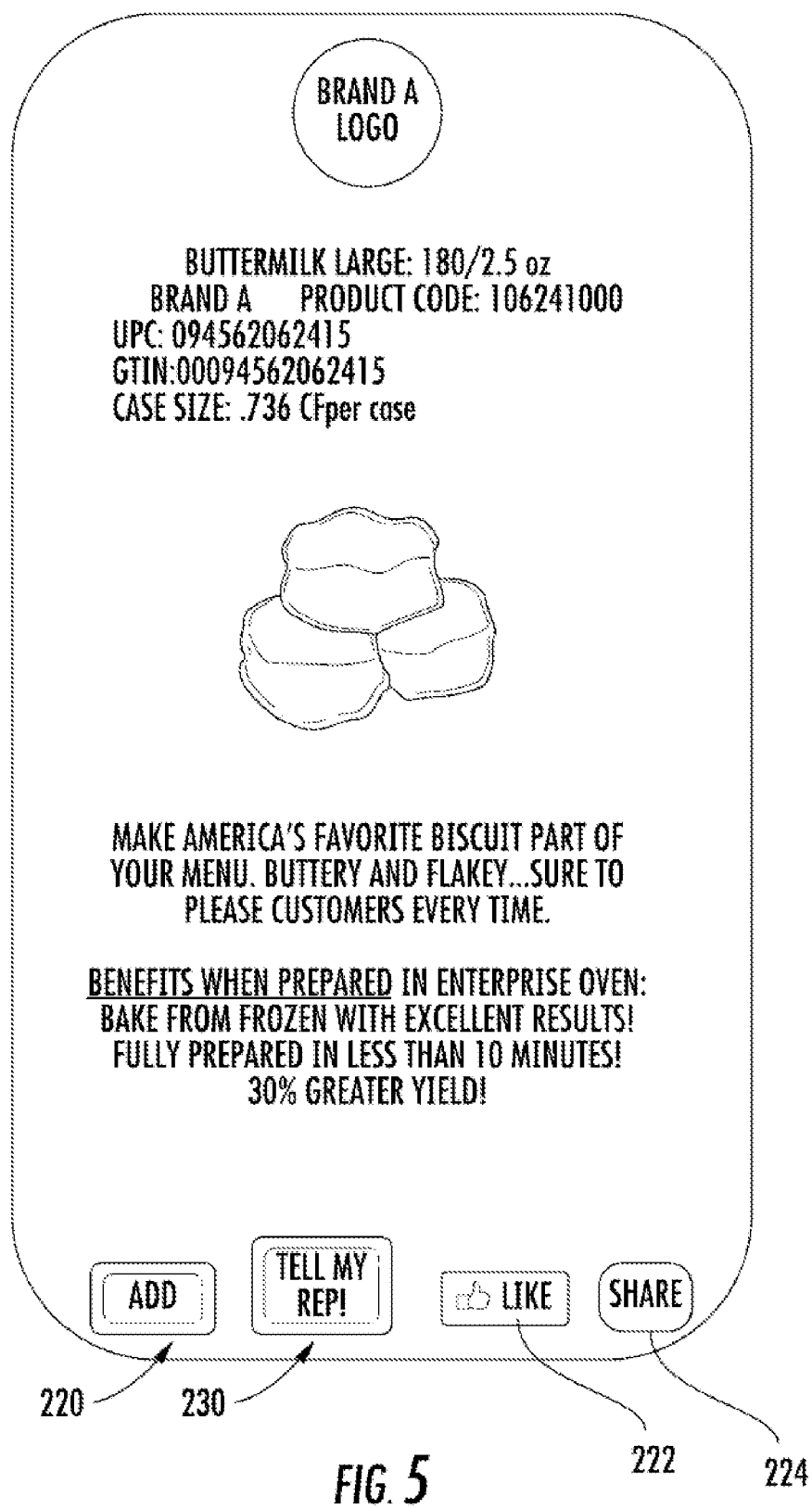
FIG. 5 illustrates an example of a recipe that may be provided by in a vendor library according to an example embodiment.

FIG. 4 illustrates an example of a recipe that may be provided by a featured chef or other community member. As shown in FIG. 4, a selection option 200 may be provided to enable the viewer to add the recipe to a personal or company library. Alternatively, a print option 210 may be provided to print the recipe. A rating option 212 may also be provided in some cases. Some embodiments may also or alternatively include a share option 214, which may be selected to post information associated with the recipe to a social networking site or to a public library. Meanwhile FIG. 5 illustrates an example of a recipe that may be provided by in a vendor library (e.g., by a manufacturer). The example of FIG. 5 also includes a selection option 220 to enable the recipe to be added to a personal or company library. The example of FIG. 5 further shows an example in which a rating option 222 and a share option 224 are provided. Thus, third party participants may enable asset operators to provide feedback on content items in the form of ratings or specific comments.

Figure 8:
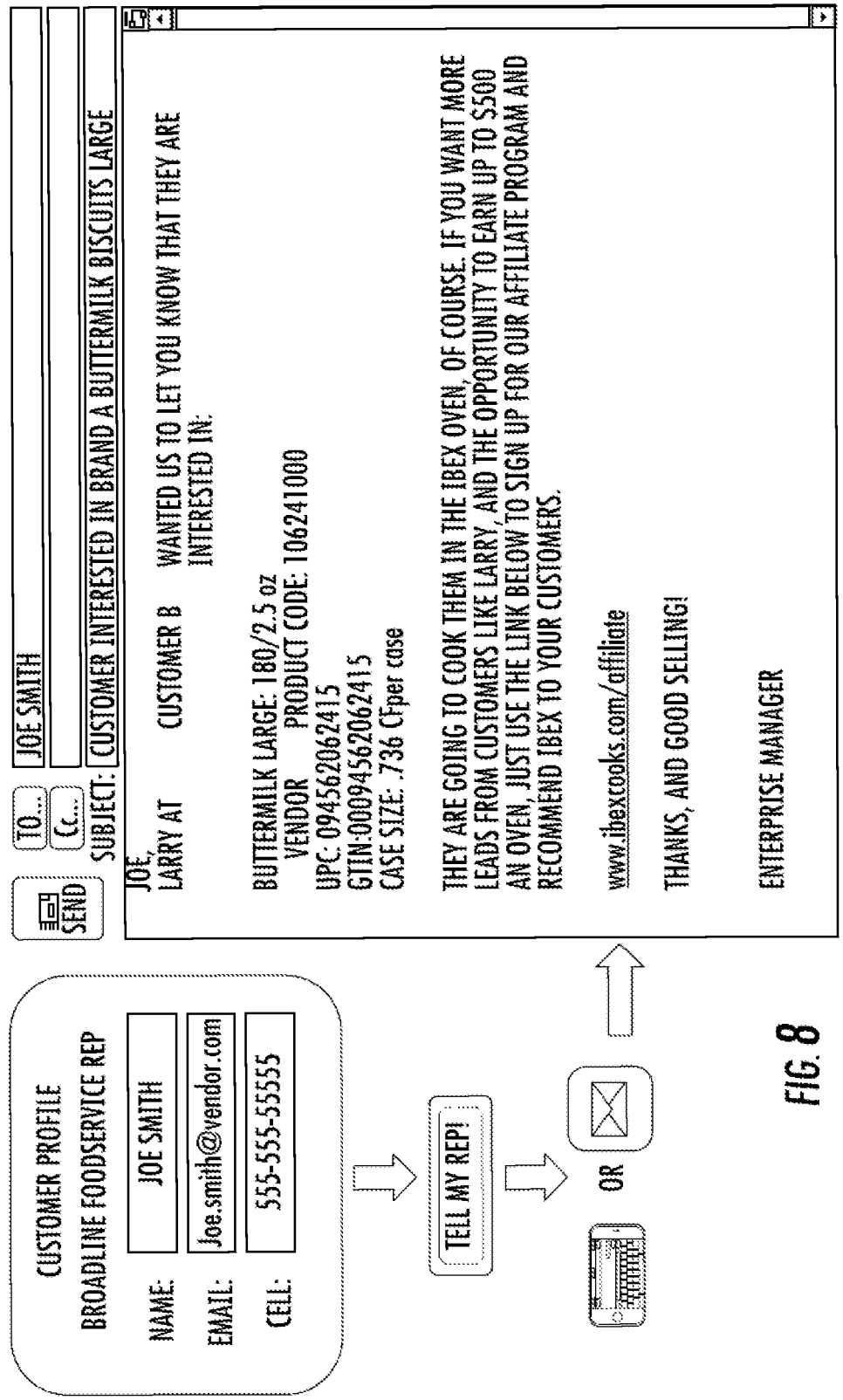
FIG. 8 illustrates an example of a preformatted message generated according to an example embodiment.

As shown in the example of FIG. 5, in some embodiments, a content item further includes a contact link or option 230, the selection of which may call up a preformatted message to enable the viewer to contact a distributor or other third party participant. In some cases, selection of the contact link 230 may enable an asset operator to send a preformatted message about obtaining product to enable preparation of the recipe. The preformatted message may take information identifying the product, or contents of the recipe, and use such information to identify a distributor and/or sales representative having contact information on file in association with the corresponding recipe or product line. The corresponding sales representative or distributor may then be contacted directly (e.g., via email) to inquire about the recipe or to order product. Alternatively or additionally, the contact link 230 may be selectable by a particular asset operator to launch an at least partially preformatted message to be sent to a sales representative affiliated with the third party participant. In some cases, the sales representative to be addressed may be determined based on context information associated with the particular asset operator. FIG. 8 illustrates an example of a preformatted message generated according to an example embodiment.

Alternatively or additionally, distributors or producers may obtain information on selections made to inquire about products, download recipes, and/or the like. Thus, for example, the distributor or manufacturer of products may use the content manager 44 to provide a mechanism by which to obtain leads on products that customers want. As such, some example embodiments may be used in connection with the establishment of an affiliate program. Such a program may include the passing along of information by the oven distributor or enterprise manager to affiliates to let the corresponding affiliates know about leads, click through volume, questions, orders or other information associated with customer or potential customer activity as such activity relates to the ovens. The affiliate program may serve as a low-cost channel with relatively wide scope via which customers or potential customers may be reached with multiple motivation points.

Figure 6:
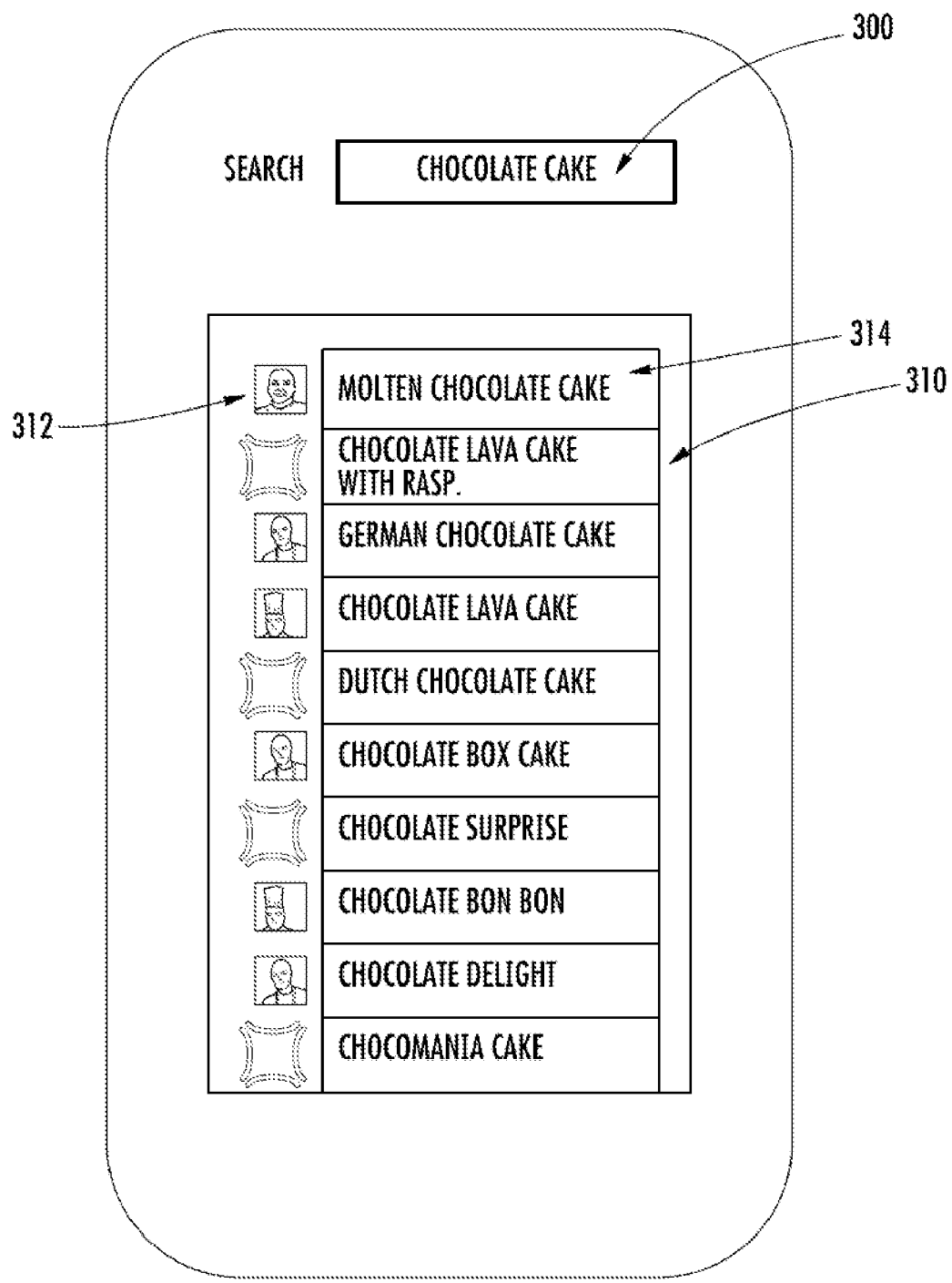
FIG. 6 illustrates a search page for use in connection with a public library according to an example embodiment.

In an example embodiment, the content manager 44 may further enable community members to conduct searching operations for content of interest. For example, community members may search a given library for recipes of interest. FIG. 6 illustrates an example search page for use in connection with a community library. As shown in FIG. 6, the search query may be provided in a search field 300. The search may be for a particular recipe, cooking signature, manufacturer, distributor, content item, chef, and/or the like. A list of search results 310 may then be provided. In some cases, an identity of the author of each listing may be provided via an icon, image or graphic 312 along with a short title 314 of the corresponding content item. If one of the content items is selected (e.g., at one of the clients 20), a corresponding recipe may be retrieved (e.g., by the content manager 44 at the application server 40) and presented to the user (at the client 20). As an example, if the top content item in FIG. 6 is selected, the recipe of FIG. 4 may be retrieved and presented.

Figure 7:
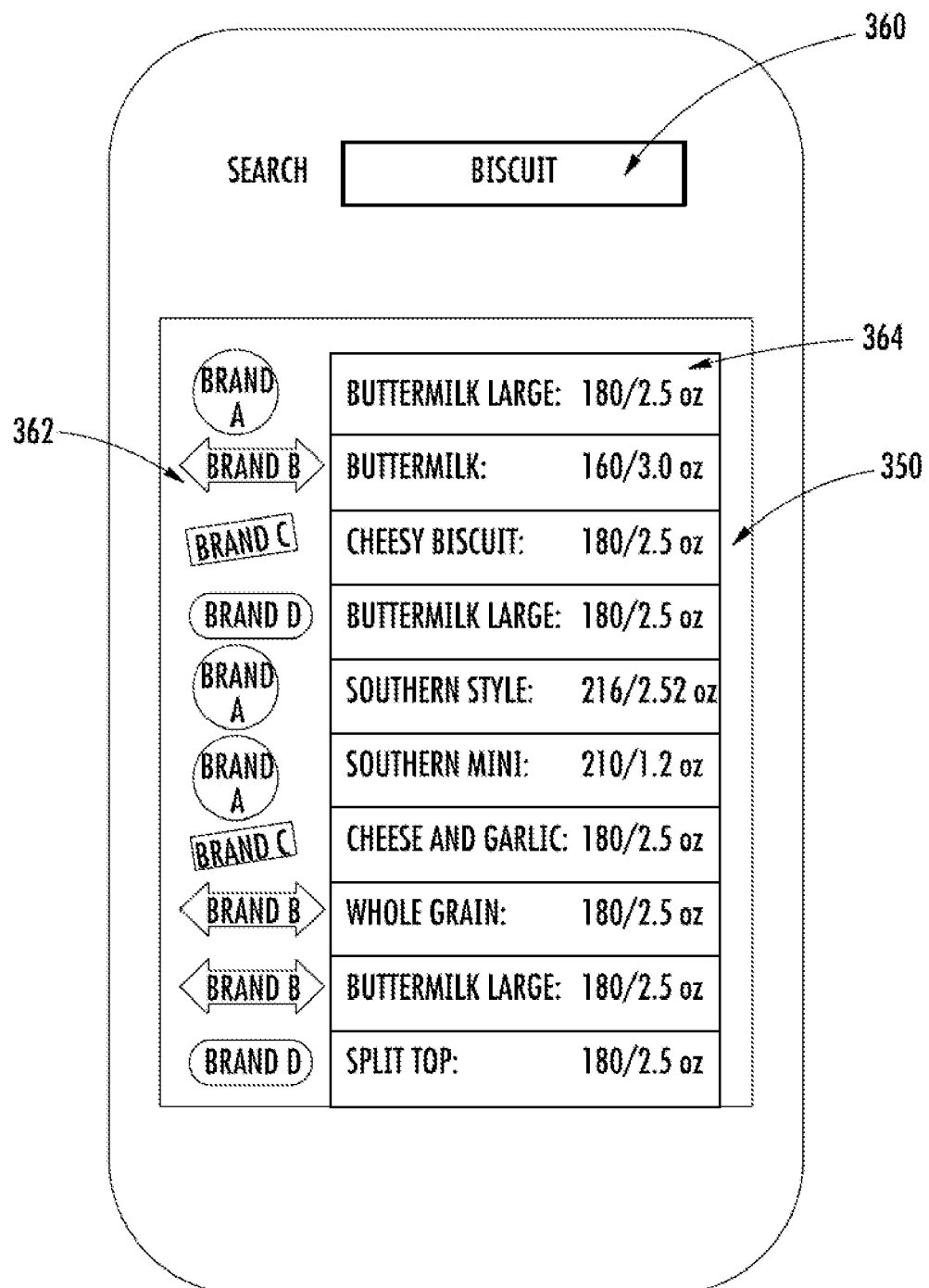
FIG. 7 illustrates a search page for use in connection with a vendor library according to an example embodiment.

Similarly, FIG. 7 illustrates an example search page for use in connection with a vendor library and responsive to selection of a top item among the content items in search results 350 of FIG. 7, the recipe of FIG. 5 may be retrieved and presented. As such, FIG. 7 may include a search field 360 in which a query may be provided in a manner similar to that which was described above in connection with the description of FIG. 6. In FIG. 7, author identities may be replaced with brand or company identifiers 362. However, short titles or descriptors 364 may also be provided.

In some embodiments, the content manager 44 may host discussion forums, or provide a platform for sharing cooking demonstration videos as streamed or downloadable content in addition to recipes, products and/or cooking signatures. Community members may post status information, questions, or other discussion to public or private message boards, and other community members may exchange information or discussion points with each other via the message boards. As such, the content manager 44 may provide a platform for the receipt of content from community members (e.g., oven owners), from the enterprise manager (e.g., the oven distributor), and from other organizations that provide services or products related to the oven (e.g., service companies, food distributors, food manufacturers, and/or the like). The content manager 44 may provide tools for the storage or posting of content at any of various libraries or other forums, and may further provide tools for accessing the content, which may in some cases include access restrictions.

Figure 9:
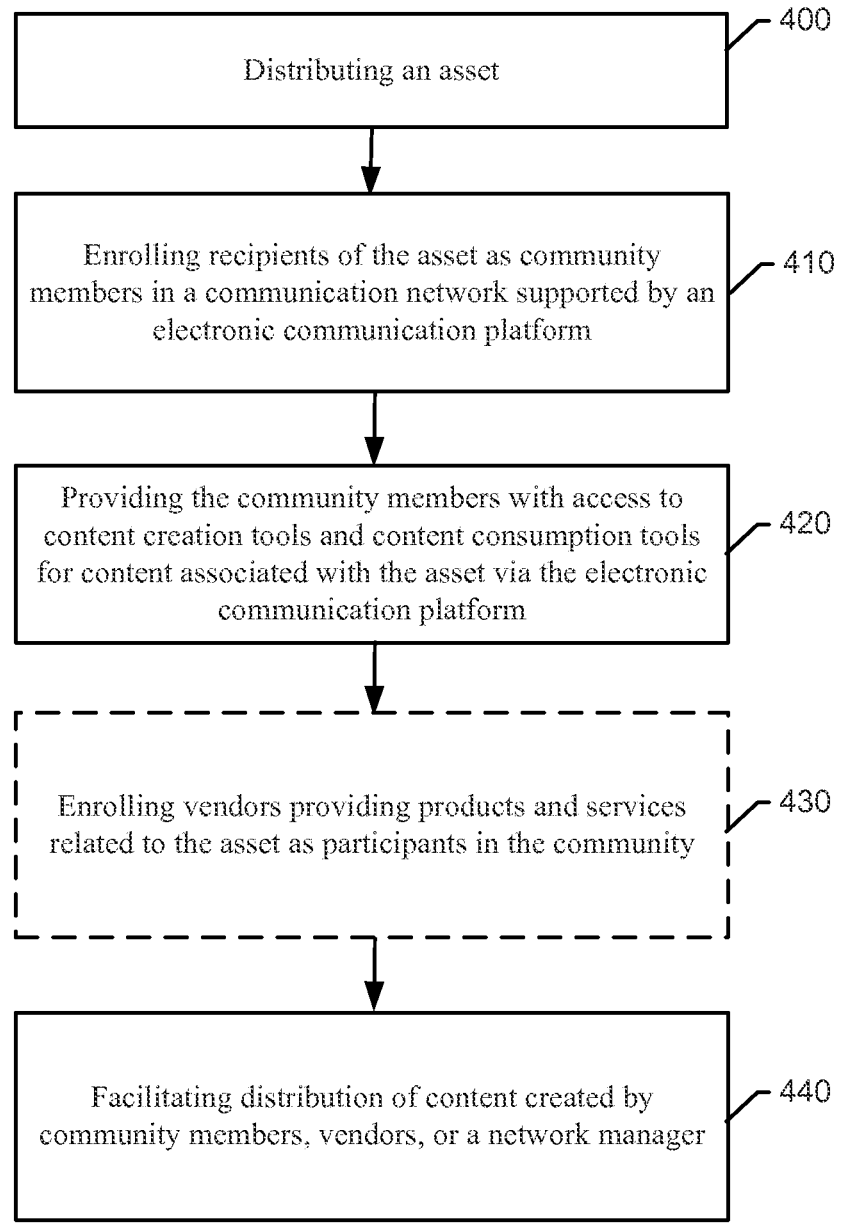
FIG. 9 illustrates a block diagram of a method that may be supported by the system of FIG. 1 according to an example embodiment.

As such, the system of FIG. 1 may provide a mechanism via which a number of useful methods may be practiced. FIG. 9 illustrates a block diagram of one method that may be associated with the system 10 of FIG. 1. As shown in FIG. 9 the method may include distributing (e.g., via sale, lease, grant, etc.) an asset (e.g., an oven) at operation 400. The method may further include enrolling recipients of the asset as community members in a communication network supported by an electronic communication platform (e.g., the system 10 and specifically, the content manager 44) at operation 410. At operation 420, the method may further include providing the community members with access to content creation tools and content consumption tools for content associated with the asset via the electronic communication platform. Although not required, the method may further include enrolling vendors providing products and services related to the asset as participants in the community at operation 430. In some embodiments, the method may further include facilitating distribution of content created by community members, vendors, or a network manager at operation 440.

Figure 10:
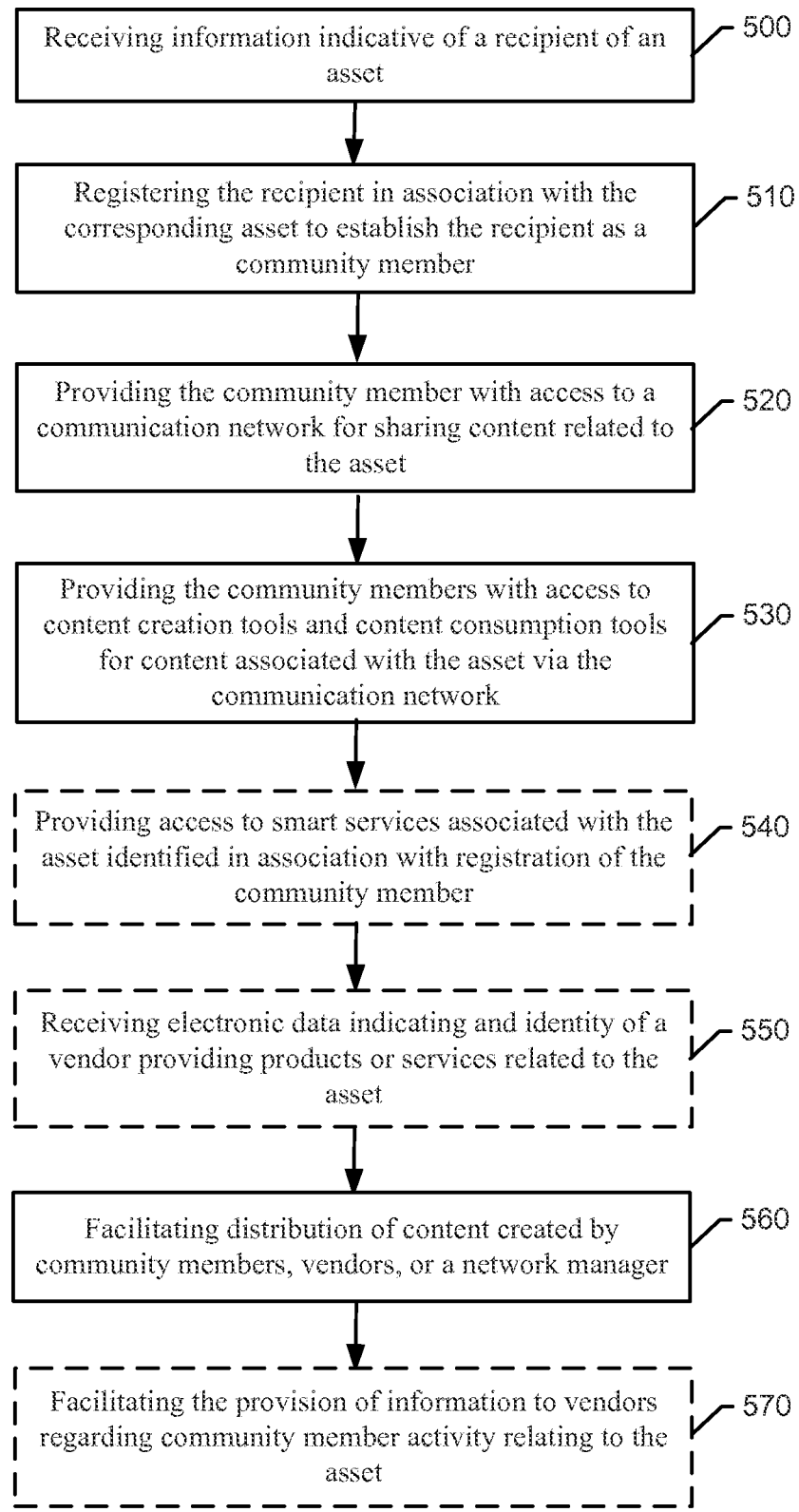
FIG. 10 illustrates a block diagram of a method according to an example embodiment.

From a technical perspective, the content manager 44 described above may be used to support some or all of the operations described in FIG. 9. As such, the platform described in FIGS. 1-3 may be used to facilitate the implementation of several computer program and/or network communication based interactions. As an example, FIG. 10 is a flowchart of a method and program product according to an example embodiment of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of a user terminal (e.g., oven 10, client 20, application server 40, and/or the like) and executed by a processor in the user terminal. As will be appreciated, any such computer program instructions may be loaded onto a computer or other programmable apparatus (e.g., hardware) to produce a machine, such that the instructions which execute on the computer or other programmable apparatus create means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture which implements the functions specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart block(s).

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In this regard, a method according to one embodiment of the invention, as shown in FIG. 10, may include receiving information indicative of a recipient of an asset (e.g., an oven) at operation 500. The information may be electronic data indicating an identity of the asset and an organization associated with the asset. The method may further include registering the recipient in association with the corresponding asset to establish the recipient as a community member at operation 510. The method may further include providing the community member with access to a communication network for sharing content related to the asset at operation 520. In some embodiments, the method may further include providing the community members with access to content creation tools and content consumption tools for content associated with the asset via the communication network at operation 530. Although not required, the method may further include providing access to smart services associated with the asset identified in association with registration of the community member at operation 540. Also not required, the method may include receiving electronic data indicating and identity of a vendor providing products or services related to the asset at operation 550 and in some cases also registering the vendor as a participant in the communication network. In some embodiments, the method may further include facilitating distribution of content created by community members, vendors, or a network manager at operation 560. The method may further include facilitating the provision of information (e.g., leads, orders, etc.) to vendors (or other third party participants) regarding community member activity relating to the asset at operation 570. In some embodiments, facilitation as described herein may include the application of algorithms for determining which content to present to corresponding community members and/or the application of algorithms for organizing the content received according to access rules and/or the generation of preformatted messages to be used to provide communication between or regarding community members and vendors.

In an example embodiment, an apparatus for performing the method of FIG. 10 above may comprise a processor (e.g., the processor 52) configured to perform some or each of the operations (500-570) described above. The processor may, for example, be configured to perform the operations (500-570) by performing hardware implemented logical functions, executing stored instructions, or executing algorithms for performing each of the operations.

Figure 13:
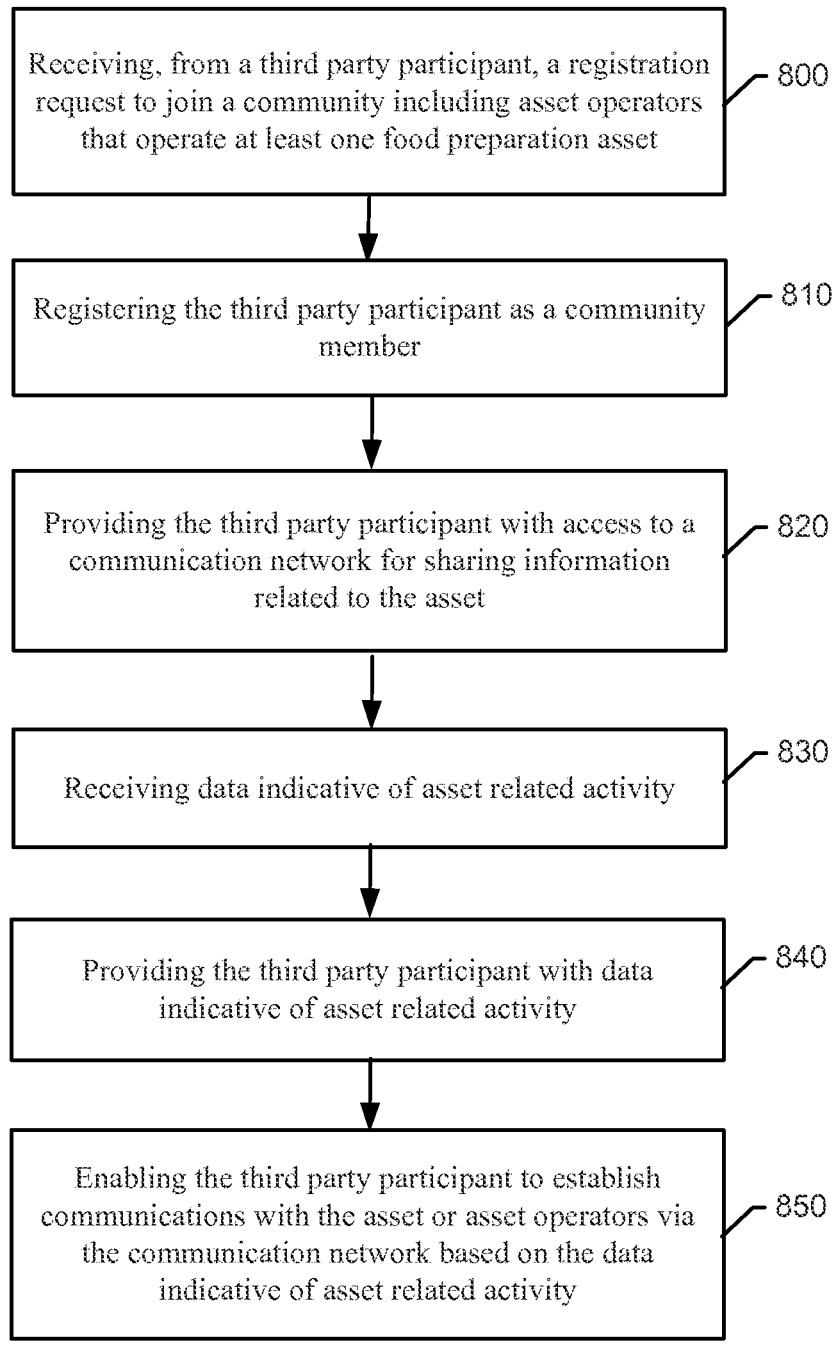
FIG. 13 illustrates a method for enabling network communication relating to a food preparation asset according to an example embodiment.

In some cases, the method of FIG. 10 may be tailored specifically to third party participants aiming to interact with assets or asset operators on the basis of usage data that can be provided from the assets or asset operators. FIG. 13 illustrates such an example, in which the method may include receiving, from a third party participant, a registration request to join a community including asset operators that operate at least one food preparation asset at operation 800, registering the third party participant as a community member at operation 810, and providing the third party participant with access to a communication network for sharing information related to the asset at operation 820. The method may further include receiving data indicative of asset related activity at operation 830, providing the third party participant with data indicative of asset related activity at operation 840, and enabling the third party participant to establish communications with the asset or asset operators via the communication network based on the data indicative of asset related activity at operation 850.

In some cases, receiving data indicative of asset related activity may include receiving reports of asset related activity in real time or receiving a data usage file indicative of asset related activity over a defined period of time. The data usage file may be provided wirelessly or via a removable memory device. In an example embodiment, receiving data indicative of asset related activity may include receiving data indicative of operational activity, download activity or search activity of the asset. In such an example, enabling the third party participant to establish communications with the asset or asset operators via the communication network based on the data indicative of asset related activity may include enabling the third party participant to offer a product or service to the asset or asset operators such that the product or service is determined based on the operational activity, download activity or search activity, respectively. In some embodiments, receiving data indicative of asset related activity may include receiving aggregated data indicative of aggregated asset related activity of a plurality of assets. In such an example, a comparison may be enabled to be made between the aggregated data and data of a selected asset. In some cases, the method may further include enabling a comparison between the aggregated data and data of a selected asset or selected organization, and the aggregated data may be provided by a pool of providers in which the pool is defined based on product, location, or industry.

Figure 11:
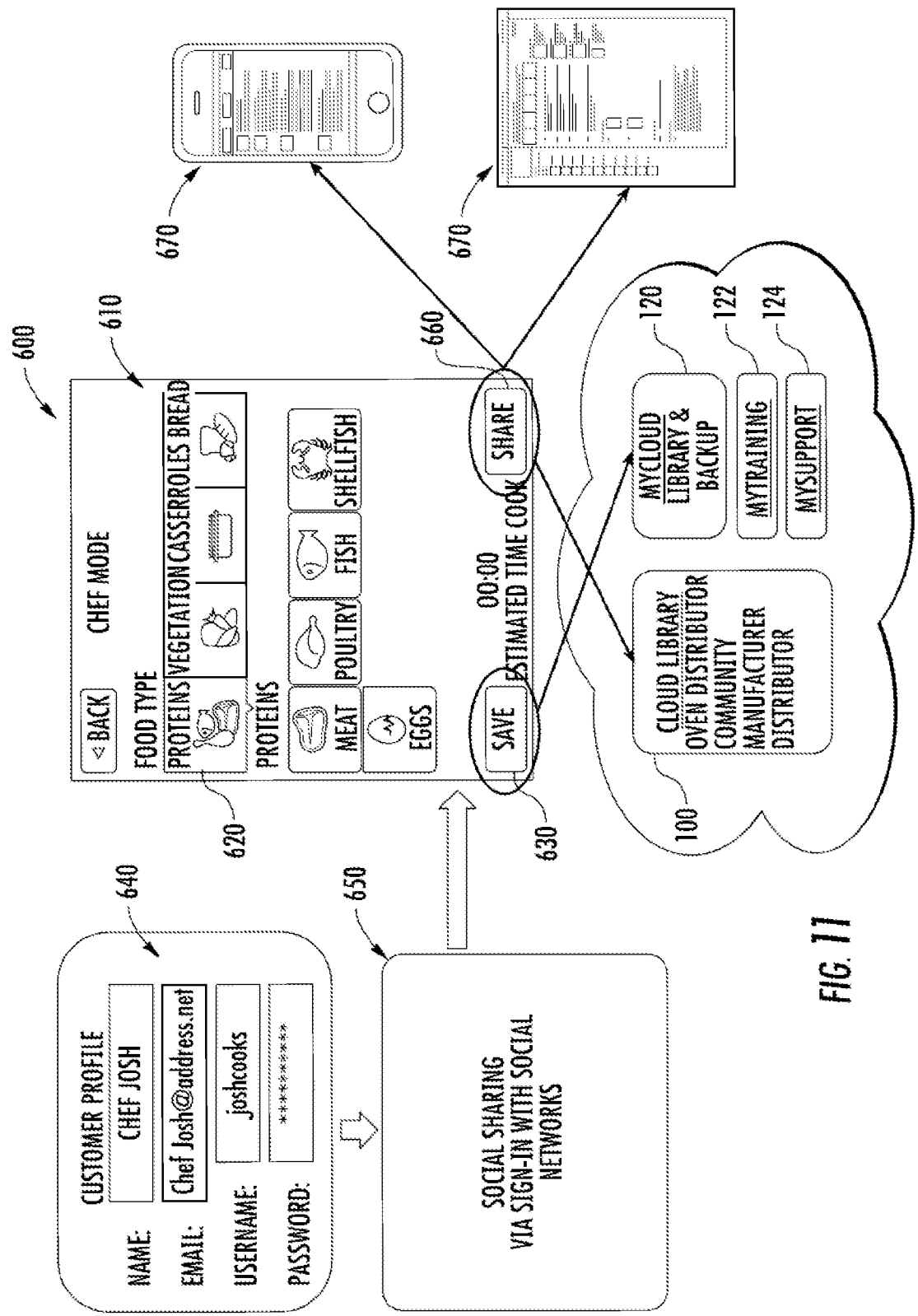
FIG. 11 illustrates an example of direct integration of the oven into the system according to an example embodiment.

Example embodiments may also provide for easy integration with the ovens themselves in situations where the ovens are capable of being online with or at least accessible via the network 30. FIG. 11 illustrates an example of how the oven may be directly integrated into the system 10. In this regard, for example, an oven control console 600 is displayed. The details of the workings and/or display capabilities of the oven control console may vary in different embodiments, and thus, the oven control console 600 of FIG. 11 is merely exemplary. However, the oven control console 600 shows a selection ribbon 610 that is populated with the selections defined for creating a recipe via the icons 620 presented in association with various food types. In an example embodiment, the oven control console 600 may further include a save button 630 that may save the recipe defined to the content manager 44. Thus, for example, the recipe may be saved to the cloud library 100 or to a private cloud (e.g., My Cloud Library 120). In some embodiments, the chef or other individual creating the recipe may be signed or logged in and may therefore be associated with a customer profile 640. The customer profile 640 may also have an association with one or more social networking sites 650. The oven control console 600 may further include a share button 660. By selecting the share button 660, the recipe defined (e.g., in the selection ribbon 610), or comments/status reports associated with generation of the recipe, may be shared via one or more of the social networking sites 650 in a message posting 670. Thus, social interaction may be directly initiated based on activity at the oven via tools provided by the system 10.

Figure 12:
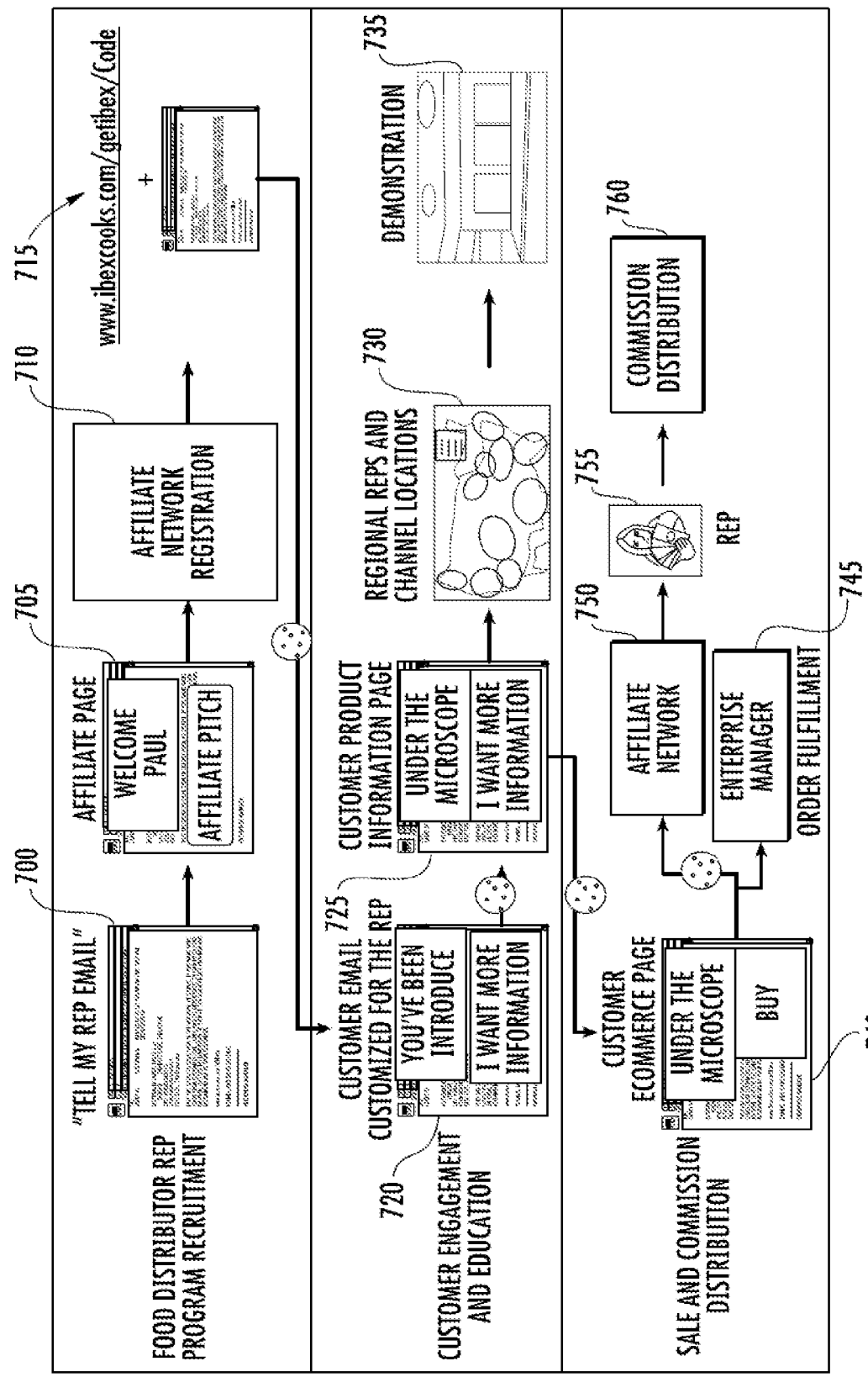
FIG. 12 illustrates an example series of activities that may be associated with one channel concept implementation according to an example embodiment.

Example embodiments may also define channels for mass market engagement between distributors and manufacturers and potential customers that may be community members. FIG. 12 illustrates an example series of activities that may be associated with one channel concept implementation. In this regard, a lead or message, which may indicate an interest expressed in a product of a distributor by a potential customer, may be generated and sent to the distributor at operation 700. A pitch may also be provided to encourage the distributor to become an affiliate at operation 705. The affiliate may register at operation 710 and may be recorded into a registry of affiliates at operation 715. Thereafter, customer emails may be customized for representatives of the distributor at operation 720 for use in facilitating engagement with customers. Product information pages may also be generated at operation 725 in order to provide information for customers. An organizational chart of representatives may be provided at operation 730 to facilitate proper routing of messages when customer interest is expressed. Demonstrations may be provided at operation 735. At operation 740, sales and distribution related activity may be commenced by preparing customer ecommerce pages. Orders and other customer activity may be reported to the enterprise manager at operation 745 and routed via the affiliate network at operation 750. Representatives may be engaged accordingly at operation 755 and then at operation 760, and commissions that are due may be provided.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A method comprising:
   receiving, from a third party participant device associated with a third party participant that is a service provider providing maintenance services, a registration request at a content manager to join a community including a manufacturer of one or more food preparation assets and asset operators, wherein each of the asset operators operate the one or more food preparation assets, and wherein the third party participant, the content manager, the manufacturer, and the asset operators are each different entities;
   registering the third party participant as a community member via the content manager;
   providing the third party participant with access to a communication network, via the content manager, for sharing information related to the one or more food preparation assets;
   receiving, by the manufacturer, asset related activity data for a selected one of the one or more food preparation assets at the content manager, wherein the asset related activity data includes run hours for the selected one of the one or more food preparation assets;
   providing the third party participant device with the asset related activity data by the manufacturer via the content manager;
   establishing communications between the selected one of the one or more food preparation assets and the third party participant device via the content manager based on the asset related activity data; and
   communicating and displaying an alert on the third party participant device by the manufacturer via the content manager to indicate maintenance is due for the selected one of the one or more food preparation assets in response to the run hours of the selected one of the one or more food preparation assets meeting or exceeding a defined preventive maintenance run hours standard.

2. The method of claim 1, wherein receiving the asset related activity data comprises receiving a data usage file of asset related activity in real time.

3. The method of claim 1, wherein receiving the asset related activity data comprises receiving a data usage file of asset related activity over a defined period of time.

4. The method of claim 3, wherein receiving the data usage file comprises receiving the data usage file wirelessly or via a removable memory device.

5. The method of claim 1, wherein receiving the asset related activity data comprises receiving operational activity data of the selected one of the one or more food preparation assets and wherein establishing communications between the selected one of the one or more food preparation assets and the third party participant device via the content manager based on the asset related activity data comprises offering a third party participant product to the selected one of the one or more food preparation assets, the third party participant product being determined based on the operational activity of the selected one of the one or more food preparation assets.

6. The method of claim 1, wherein receiving the asset related activity data comprises receiving operational activity data of the selected one of the one or more food preparation assets and wherein establishing communications between the selected one of the one or more food preparation assets and the third party participant device via the content manager based on the asset related activity data comprises offering a third party participant service to the selected one of the one or more food preparation assets, the third party participant service being determined based on the operational activity of the selected one of the one or more food preparation assets.

7. The method of claim 1, wherein receiving the asset related activity data comprises receiving aggregated asset related activity data of a plurality of food preparation assets and comparing the aggregated asset related activity data to the asset related activity of the selected one of the one or more food preparation assets.

8. The method of claim 7, wherein the aggregated asset related activity data is provided by a pool of asset operators.

9. The method of claim 1, wherein displaying the alert comprises displaying a preformatted message on the third party participant device to indicate the maintenance is due.

10. A data usage analysis platform comprising processing circuitry including a processor and memory, wherein the processor is configured to:
    receive, from a third party participant device associated with a third party participant that is a service provider providing maintenance services, a registration request at a content manager to join a community including a manufacturer of one or more food preparation assets and asset operators, wherein each of the asset operators operate the one or more food preparation assets, and wherein the third party participant, the content manager, the manufacturer, and the asset operators are different entities;

register the third party participant as a community member via the content manager;

provide the third party participant with access to a communication network, via the content manager, for sharing information related to the one or more food preparation assets;

receive, by the manufacturer, asset related activity data for a selected one of the one or more food preparation assets at the content manager, wherein the asset related activity data includes run hours for the selected one of the one or more food preparation assets;

provide the third party participant device with the asset related activity data by the manufacturer via the content manager;

establish communications between the selected one of the one or more food preparation assets and the third party participant device via the communication network based on the asset related activity data; and communicate and display an alert on the third party participant device by the manufacturer via the content manager to indicate maintenance is due for the selected one of the one or more food preparation assets in response to the run hours of the selected one of the one or more food preparation assets meeting or exceeding a defined preventive maintenance run hours standard.

11. The platform of claim 10, wherein the processor being configured to receive the asset related activity data comprises the processor being configured to receive a data usage file of asset related activity in real time.

12. The platform of claim 10, wherein the processor being configured to receive the asset related activity data comprises the processor being configured to receive a data usage file of asset related activity over a defined period of time.

13. The platform of claim 12, wherein the processor being configured to receive the data usage file comprises the processor being configured to receive the data usage file wirelessly or via a removable memory device.

14. The platform of claim 10, wherein the processor being configured to receive the asset related activity data comprises the processor being configured to receive operational activity data of the selected one of the one or more food preparation assets and wherein the processor being configured to establish communications between the selected one of the one or more food preparation assets via the communication network based on the asset related activity data comprises the processor being configured to offer a third party participant product to the selected one of the one or more food preparation assets, the third party participant product being determined based on the operational activity of the selected one of the one or more food preparation assets.

15. The platform of claim 10, wherein the processor being configured to receive the asset related activity data comprises the processor being configured to receive operational activity data of the selected one of the one or more food preparation assets and wherein the processor being configured to establish communications between the selected one of the one or more food preparation assets via the communication network based on the asset related activity data comprises the processor being configured to offer a third party participant service to the selected one of the one or more food preparation assets, the third party participant service being determined based on the operational activity of the selected one of the one or more food preparation assets.

16. The platform of claim 10, wherein the processor being configured to receive asset related activity data comprises the processor being configured to receive aggregated asset related activity data of a plurality of food preparation assets and compare the aggregated asset related activity data to the asset related activity of the selected one of the one or more food preparation assets.

17. The platform of claim 10, wherein displaying the alert comprises displaying a preformatted message on the third party participant device to indicate the maintenance is due.

18. A system for data usage analysis comprising processing circuitry including a processor and memory, wherein the processor is configured to:

receive, from a third party participant device associated with a third party participant that is a service provider providing maintenance services, a registration request at a content manager to join a community, the community including a manufacturer of one or more food preparation assets and operators, wherein each of the operators operate the one or more food preparation ovens;

register the third party participant as a community member via the content manager;

provide the third party participant with access to a communication network, via the content manager, for sharing information related to the one or more food preparation ovens;

receive, by the manufacturer, oven operational data associated with a selected one of the one or more food preparation ovens at the content manager, wherein the oven operational data includes run hours for the selected one of the one or more food preparation ovens;

provide the third party participant device with the oven operational data by the manufacturer via the content manager; and establish communications between the selected one of the one or more food preparation ovens and the third party participant device via the communication network; and communicate and display an alert on the third party participant device by the manufacturer via the content manager to indicate maintenance is due for the selected one of the one or more food preparation ovens in response to the run hours of the selected one of the one or more food preparation ovens meeting or exceeding a defined preventive maintenance run hours standard.

19. The system of claim 18, wherein displaying the alert comprises displaying a preformatted message on the third party participant device to indicate the maintenance is due.

* * * * *